US012485689B2

(12) United States Patent
Lee et al.

(10) Patent No.: US 12,485,689 B2
(45) Date of Patent: Dec. 2, 2025

(54) INK-JET PRINTING APPARATUS, AND METHOD OF FORMING PATTERNS USING THE SAME

(71) Applicant: Samsung Display Co., LTD., Yongin-si (KR)

(72) Inventors: Sang Jin Lee, Yongin-si (KR); Hong Gi Min, Yongin-si (KR); Sang Hyoung Ryu, Yongin-si (KR); Myung Soo Huh, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 274 days.

(21) Appl. No.: 18/138,236

(22) Filed: Apr. 24, 2023

(65) Prior Publication Data

US 2024/0042780 A1 Feb. 8, 2024

(30) Foreign Application Priority Data

Aug. 5, 2022 (KR) ........................ 10-2022-0097687

(51) Int. Cl.
*B41J 29/393* (2006.01)

(52) U.S. Cl.
CPC ...... *B41J 29/393* (2013.01); *B41J 2029/3935* (2013.01)

(58) Field of Classification Search
CPC .. B41J 29/393; B41J 2029/3935; B41J 11/06; B41J 2/2135; B41J 2/2146; B41J 2/07; B41J 2202/09; H10K 71/135; G02B 5/201
See application file for complete search history.

(56) References Cited

FOREIGN PATENT DOCUMENTS

| | | | | |
|---|---|---|---|---|
| EP | 2394745 A1 * | 12/2011 | .......... | B41J 2/04508 |
| KR | 20110110275 | 10/2011 | | |
| KR | 20200053056 | 5/2020 | | |

* cited by examiner

*Primary Examiner* — Jannelle M Lebron
(74) *Attorney, Agent, or Firm* — CANTOR COLBURN LLP

(57) ABSTRACT

An ink-jet printing apparatus includes an ink-jet head unit including an ink-jet head, and a control device which controls an ink ejection timing of the ink-jet head and includes a comparator comparing first printing pattern information that is stored and second printing pattern information that is input with each other, a control signal generator generating a first head control signal based on the first printing pattern information when a difference between the first printing pattern information and the second printing pattern information is a reference value or less and generating a second head control signal different from the first head control signal based on the second printing pattern information when the difference between the first printing pattern information and the second printing pattern information exceeds the reference value, and a data output unit providing the first head control signal or the second head control signal to the ink-jet head unit.

20 Claims, 20 Drawing Sheets

INK-JET PRINTING APPARATUS, AND METHOD OF FORMING PATTERNS USING THE SAME

This application claims priority to Korean Patent Application No. 10-2022-0097687, filed on Aug. 5, 2022, and all the benefits accruing therefrom under 35 U.S.C. § 119, the content of which in its entirety is herein incorporated by reference.

BACKGROUND

1. Field

The disclosure relates to an ink-jet printing apparatus and a method of forming patterns using the same.

2. Description of the Related Art

An importance of display devices is increasing with a development of multimedia. Accordingly, various types of display devices such as an organic light-emitting display ("OLED") and a liquid crystal display ("LCD") have been used.

The display devices display images, and include display panels such as organic light-emitting display panels or liquid crystal display panels. Among them, a light-emitting display panel may include light-emitting elements such as light-emitting diodes ("LEDs"), and examples of such light-emitting diodes include organic light-emitting diodes ("OLED") that use an organic material as a light-emitting material, inorganic light-emitting diodes that use an inorganic material as a light-emitting material, and the like.

An ink-jet printing apparatus may be used in order to form a color filter layer or an organic material layer included in the display device or form patterns of the display device. The color filter layer or the organic material layer may be formed by printing any ink or solution in an ink-jet manner and then performing a post-treatment process. In the ink-jet printing apparatus, a predetermined ink or solution may be supplied to an ink-jet head, and the ink-jet head may perform a process of ejecting the ink or the solution onto a substrate (e.g., a target substrate) to be processed.

SUMMARY

Features of the disclosure provide an ink-jet printing apparatus with improved reliability by forming printing patterns.

Features of the disclosure also provide a method of forming patterns using an ink-jet printing apparatus in which efficiency of an inspection process is improved.

However, features of the disclosure are not restricted to those set forth herein. The above and other features of the disclosure will become more apparent to one of ordinary skill in the art to which the disclosure pertains by referencing the detailed description of the disclosure given below.

In an embodiment of the disclosure, an ink-jet printing apparatus includes an ink-jet head unit including at least one ink-jet head, and a control device which controls an ink ejection timing of the ink-jet head. The control device includes, a comparator comparing first printing pattern information that is stored and second printing pattern information that is input with each other, a control signal generator generating a first head control signal based on the first printing pattern information when a difference between the first printing pattern information and the second printing pattern information is a reference value or less and generating a second head control signal different from the first head control signal based on the second printing pattern information when the difference between the first printing pattern information and the second printing pattern information exceeds the reference value, and a data output unit providing the first head control signal or the second head control signal generated by the control signal generator to the ink-jet head unit, the first head control signal includes a plurality of first ejection sections and a plurality of first non-ejection sections that are alternately repeated, the second head control signal includes a plurality of second ejection sections and a plurality of second non-ejection sections that are alternately repeated, a number of first ejection sections of the first head control signal is identical to a number of second ejection sections of the second head control signal, and a first unit interval between adjacent first ejection sections of the first head control signal is different from a second unit interval between adjacent second ejection sections of the second head control signal.

In an embodiment, the first ejection section and the second ejection section may have a same time duration.

In an embodiment, each of the number of first ejection section and the number of second ejection section may be n, and an i-th first ejection section and an i-th second ejection section may partially overlap each other (here, n is an integer of 2 or more and i is an integer of 1 or more and n or less).

In an embodiment, a j-th first ejection section and a j-th second ejection section may completely overlap each other (here, j is an integer of 2 or more and n or less, different from i).

In an embodiment, a j+1-th first ejection section and a j+1-th second ejection section may partially overlap each other.

In an embodiment, the second unit interval may be greater than the first unit interval by x times the first unit interval (here, x is a real number between 0 and 1).

In an embodiment, the first printing pattern information that is stored may be information on a target pattern, and the second printing pattern information that is input may be pattern information of a pattern ejected by the first printing pattern information.

In an embodiment, the ink-jet printing apparatus may further include a pattern sensing unit collecting the second printing pattern information.

In an embodiment, the pattern sensing unit may include at least one pattern sensor part, the ink-jet head is provided in plural and two or more ink-jet heads may gather to form at least one pack, and a number of the at least one pattern sensor parts may be identical to as a number of the at least one pack.

In an embodiment, the at least one pattern sensor part may be disposed on a same line extending in one direction as the at least one pack.

In an embodiment, the control device may correct the ink ejection timing of the ink-jet head using third printing pattern information which is pattern information of a pattern ejected by the second head control signal.

In an embodiment, the pattern ejected by the second head control signal may be formed by stretching a pattern ejected by the first printing pattern information in one direction.

In an embodiment of the disclosure, an ink-jet printing apparatus includes an ink-jet head unit including an ink-jet head, a pattern sensing unit sensing information on an ink pattern ejected to a target substrate, and a control device which controls an operation of the ink-jet head. The control device receives a first ink ejection timing according to target pattern information and correct the first ink ejection timing based on the information on the ink pattern provided from the pattern sensing unit to generate a second ink ejection timing.

In an embodiment, the second ink ejection timing may have a greater interval than the first ink ejection timing.

In an embodiment, the pattern sensing unit may include at least one pattern sensor part, the ink-jet head may be provided in plural and two or more ink-jet heads may gather to form at least one pack, and a number of pattern sensor parts may be identical to a number of at least one pack.

In an embodiment, the pattern sensor part may be disposed on a same line extending in one direction as the at least one pack.

In an embodiment of the disclosure, a method of forming patterns includes comparing first printing pattern information that is stored and second printing pattern information that is input with each other, generating a first head control signal based on the first printing pattern information when a difference between the first printing pattern information and the second printing pattern information is a reference value or less and generating a second head control signal different from the first head control signal based on the second printing pattern information when the difference between the first printing pattern information and the second printing pattern information exceeds the reference value, providing the first head control signal or the second head control signal to an ink-jet head unit, and ejecting an ink based on the first head control signal or the second head control signal. The first head control signal includes a plurality of first ejection sections and a plurality of first non-ejection sections that are alternately repeated, the second head control signal includes a plurality of second ejection sections and a plurality of second non-ejection sections that are alternately repeated, a number of first ejection sections of the first head control signal is identical to a number of second ejection sections of the second head control signal, and a first unit interval between adjacent first ejection sections of the first head control signal is different from a second unit interval between adjacent second ejection sections of the second head control signal.

In an embodiment, each of the number of first ejection section and the number of second ejection section may be n, and an i-th first ejection section and an i-th second ejection section may partially overlap each other (here, n is an integer of 2 or more and i is an integer of 1 or more and n or less).

In an embodiment, a j-th first ejection section and a j-th second ejection section may completely overlap each other (here, j is an integer of 2 or more and n or less, different from i).

In an embodiment, a j+1-th first ejection section and a j+1-th second ejection section may partially overlap each other.

With an ink-jet printing apparatus in an embodiment, the ink-jet printing apparatus may include both of an inspection device and a printing device to continuously perform a printing process and an inspection process, thereby increasing process efficiency.

With a method of forming patterns in an embodiment, it is possible to increase efficiency of the inspection process by intentionally designing correct impact areas/false impact areas.

With a method of forming patterns in an embodiment, it is possible to increase the reliability of the ink-jet printing apparatus by increasing an impact margin area.

The effects of the disclosure are not limited to the aforementioned effects, and various other effects are included in the specification.

BRIEF DESCRIPTION OF THE DRAWINGS

The above and other features and features of the disclosure will become more apparent by describing in detail embodiments thereof with reference to the attached drawings, in which.

DETAILED DESCRIPTION

Figure 1:
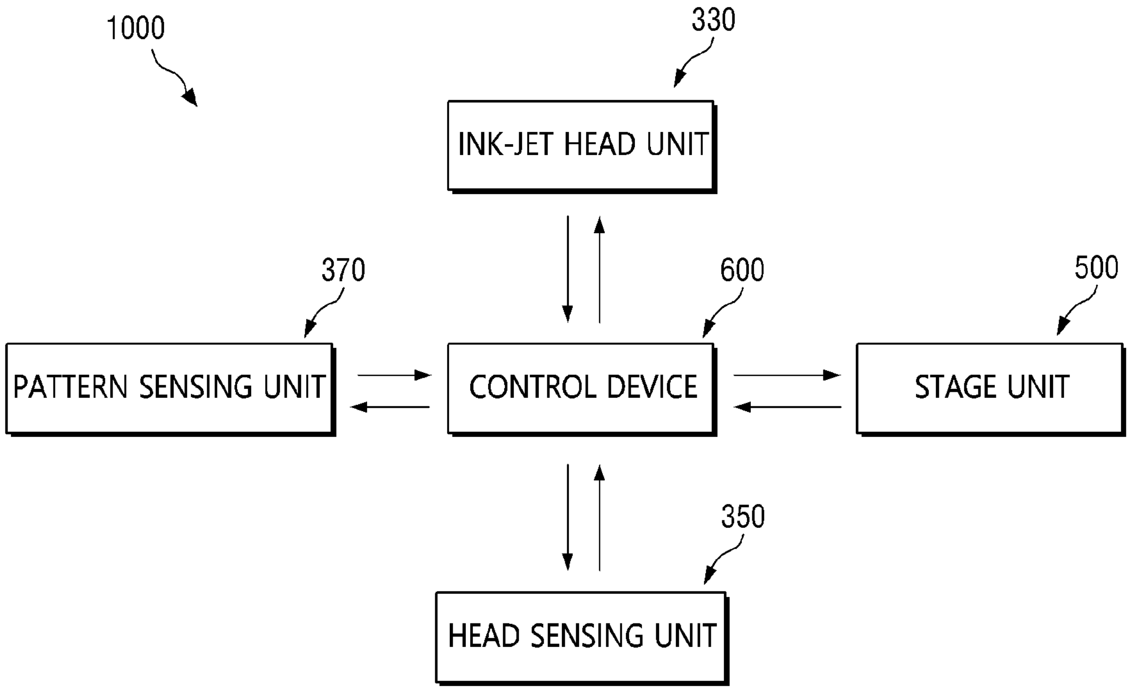
FIG. 1 is a schematic block diagram of an embodiment of an ink-jet printing apparatus.

Embodiments of the disclosure will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

The term "part" or "unit" as used herein may be intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, illustrative embodiments will be described with reference to the accompanying drawings.

Hereinafter, an ink-jet printing apparatus 1000 in an embodiment will be described.

Figure 2:
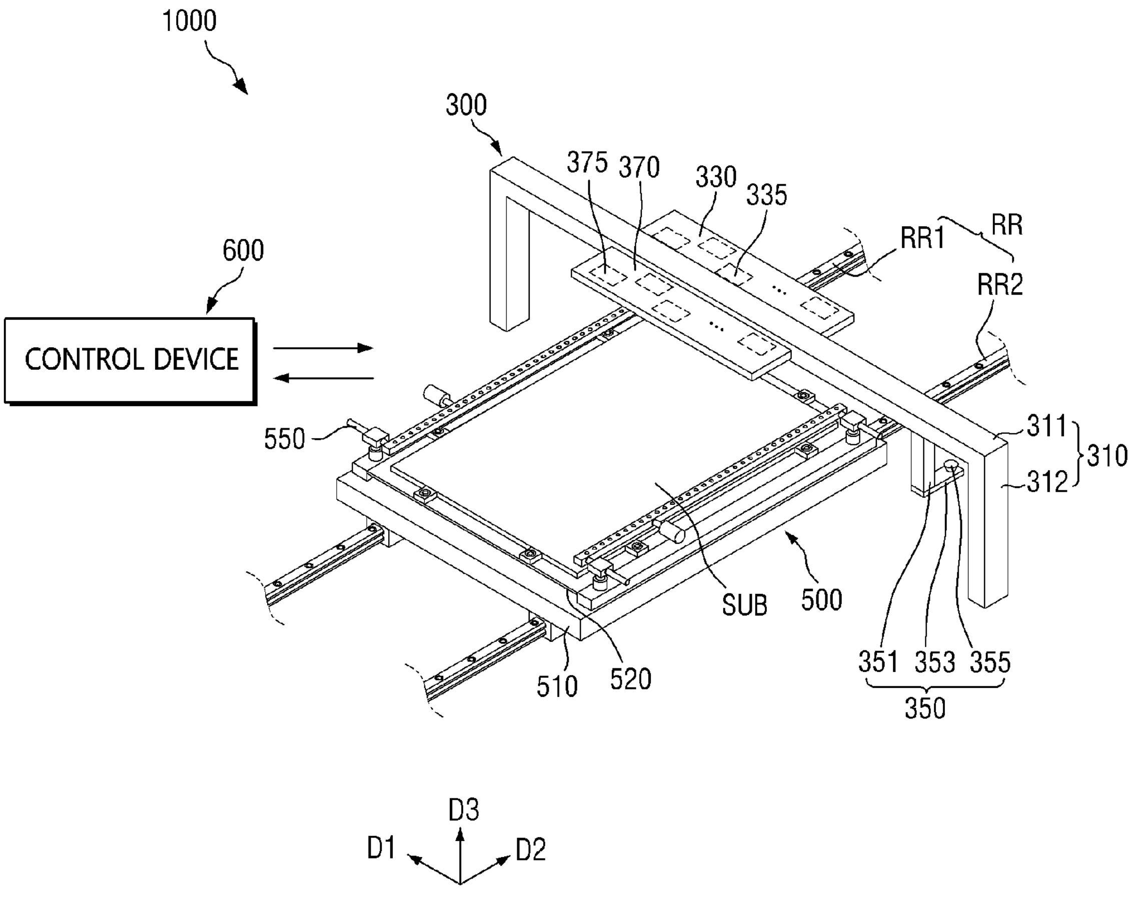
FIG. 2 is a schematic perspective view of an embodiment of the ink-jet printing apparatus.
Figure 3:
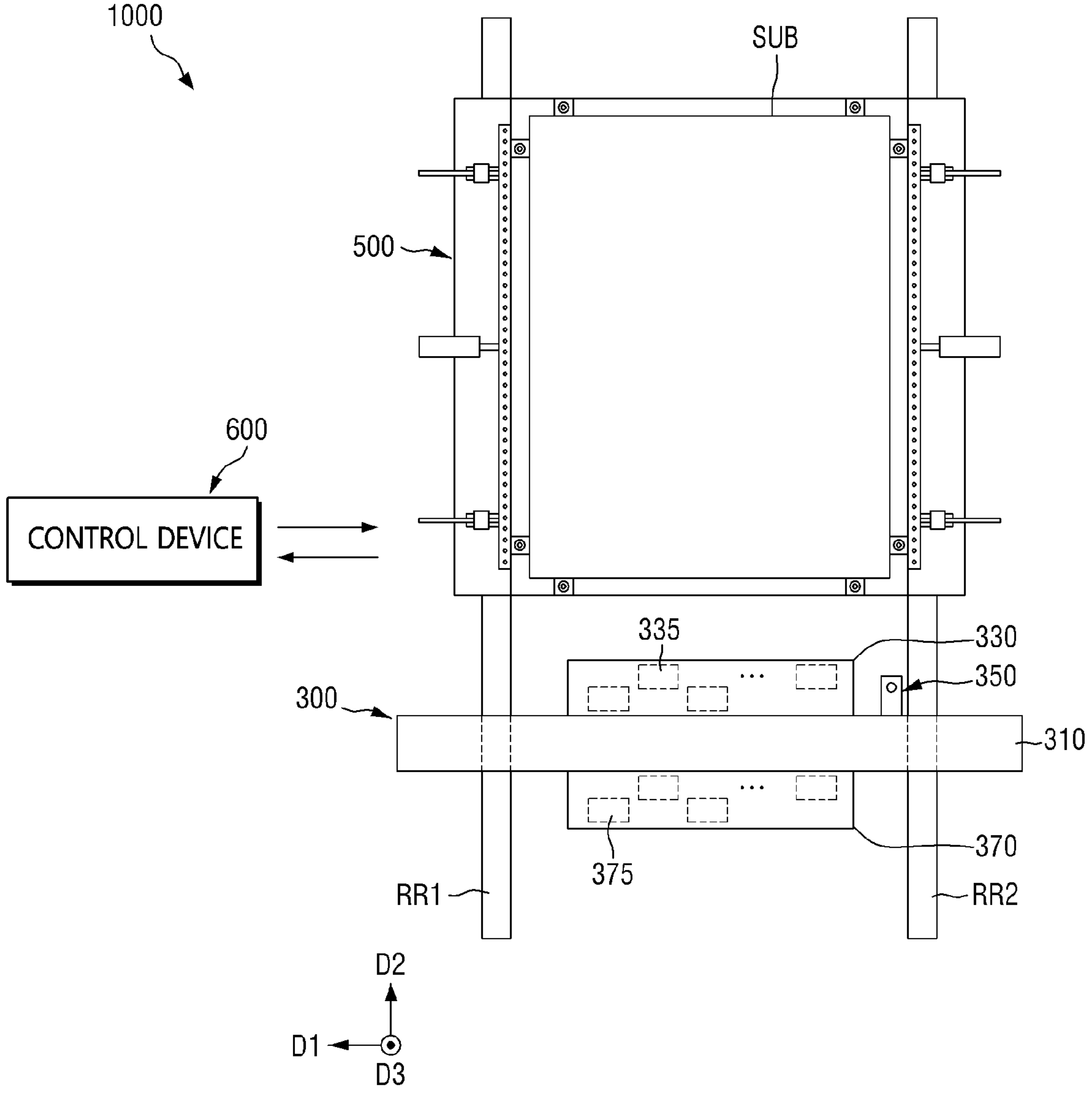
FIG. 3 is a schematic plan view of an embodiment of the ink-jet printing apparatus.
Figure 4:
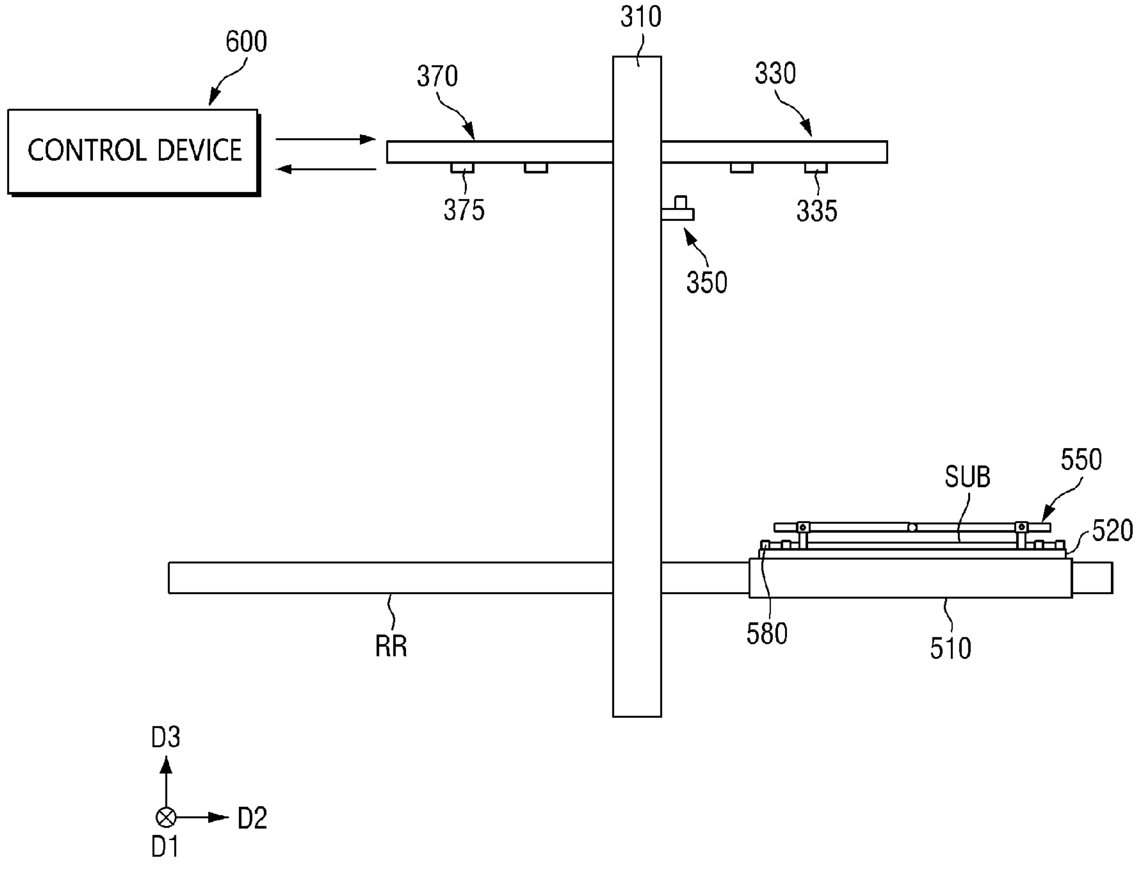
FIG. 4 is a schematic cross-sectional view of an embodiment of the ink-jet printing apparatus.

FIG. 1 is a schematic block diagram of an embodiment of an ink-jet printing apparatus. FIG. 2 is a schematic perspective view of an embodiment of the ink-jet printing apparatus. FIG. 3 is a schematic plan view of an embodiment of the ink-jet printing apparatus. FIG. 4 is a schematic cross-sectional view of the ink-jet printing apparatus. In the drawings, a first direction D1 and a second direction D2 are horizontal directions, respectively, and cross each other. In an embodiment, the first direction D1 and the second direction D2 may be orthogonal to each other, for example. In addition, a third direction D3 is a vertical direction, and is orthogonal to the first direction D1 and the second direction D2.

Referring to FIGS. 1 to 4, the ink-jet printing apparatus 1000 in an embodiment may eject a predetermined ink I (refer to FIG. 6) onto a target substrate SUB. In an embodiment, the ink-jet printing apparatus 1000 may perform a printing process by ejecting materials such as organic materials or metals in a predetermined amount and/or a predetermined pattern, for example. In addition, the ink-jet printing apparatus 1000 may perform an inspection process of inspecting a state of each member of the ink-jet printing apparatus 1000 by including inspection devices such as a head sensing unit 350 and a pattern sensing unit 370.

The ink-jet printing apparatus 1000 may be applied as one of apparatuses for manufacturing a display device. In embodiments, the display device that may be manufactured using the ink-jet printing apparatus 1000 may include a liquid crystal display device, an organic light-emitting display device, an inorganic light-emitting display device, or the like, but are not limited thereto.

The ink-jet printing apparatus 1000 in an embodiment may include an ink-jet head device 300, a stage unit 500, and a control device 600.

The ink-jet head device 300 may serve to eject the ink I to the target substrate SUB. The ink-jet head device 300 may eject the predetermined ink I onto the target substrate SUB during the printing process of the ink-jet printing apparatus 1000. The ink-jet head device 300 may perform the inspection process by scanning an ink-jet head 335, the target substrate SUB, or the like, during the inspection process of the ink-jet printing apparatus 1000.

The ink-jet head device 300 may include a first support 310, an ink-jet head unit 330, the pattern sensing unit 370, and the head sensing unit 350.

The first support 310 may include a first horizontal support part 311 and first vertical support parts 312. The first support 310 may include the first horizontal support part 311 extending in one horizontal direction, e.g., the first direction D1, and the first vertical support parts 312 connected to opposite ends of the first horizontal support part 311 and extending in the third direction D3, which is a vertical direction.

The ink-jet head unit 330 and the pattern sensing unit 370 may be disposed (e.g., mounted) on the first horizontal support part 311 of the first support 310. The ink-jet head unit 330 and the pattern sensing unit 370 may be spaced apart from the stage unit 500 by a predetermined distance in the third direction D3. It has been illustrated in the drawings that the ink-jet head unit 330 protrudes from one side of the first horizontal support part 311 in the second direction D2 and the pattern sensing unit 370 protrudes from the other side of the first horizontal support part 311 in the second direction D2. However, the disclosure is not limited thereto, and the ink-jet head unit 330 and the pattern sensing unit 370 may also protrude from the same side of one side or the other side of the first horizontal support part 311 in the second direction D2.

The head sensing unit 350 may be disposed (e.g., mounted) on the first horizontal support part 311 of the first support 310. The head sensing unit 350 may protrude from one side of the first horizontal support part 311 in the second direction D2, similar to the ink-jet head unit 330.

In some embodiments, the ink-jet printing apparatus 1000 may further include an ink supply part (not illustrated) such as an ink cartridge, and the ink I supplied from the ink supply part may be ejected toward the target substrate SUB through the ink-jet head device 300.

The stage unit 500 provides a space in which the target substrate SUB is disposed. The target substrate SUB may be disposed on the stage unit 500 during the printing process.

An overall shape of the stage unit 500 in a plan view may follow a shape of the target substrate SUB in a plan view. In an embodiment, when the target substrate SUB has a quadrangular (e.g., rectangular) shape, the overall shape of the stage unit 500 may be quadrangular (e.g., rectangular), and when the target substrate SUB has a circular shape, the overall shape of the stage unit 500 may be circular, for example. In the drawings, the stage unit 500 having a quadrangular (e.g., rectangular) shape having short sides disposed in the first direction D1 and long sides disposed in the second direction D2 has been illustrated. However, a shape of the stage unit 500 is not limited thereto, and may be modified depending on the shape of the target substrate SUB in a plan view as described above.

Figure 9:
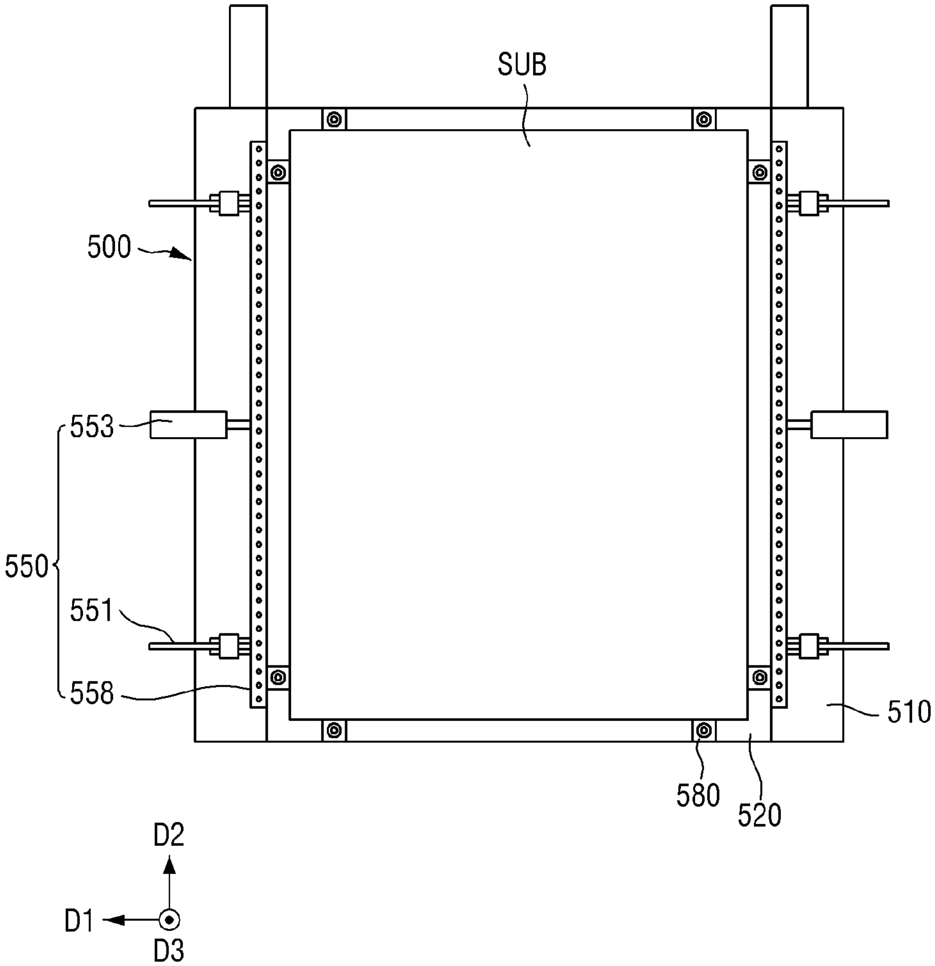
FIG. 9 is a plan view of an embodiment of a stage unit.

The stage unit 500 may include a base frame 510, a stage 520 disposed on the base frame 510, probe units 550 disposed on the base frame 510, and aligners 580 (refer to FIG. 9). A detailed description of each component of the stage unit 500 will be provided later with reference to FIG. 9.

The ink-jet printing apparatus 1000 may further include a stage moving part RR moving the stage unit 500. The stage unit 500 may be disposed on the stage moving part RR. The stage moving part RR may include a first rail RR1 and a second rail RR2 each extending in the second direction D2 and spaced apart from each other along the first direction D1. The stage unit 500 may reciprocate on the first rail RR1 and the second rail RR2 in the second direction D2. The printing process and the inspection process may be performed on the entirety of the area of the target substrate SUB while the stage unit 500 moves in the second direction D2.

Figure 10:
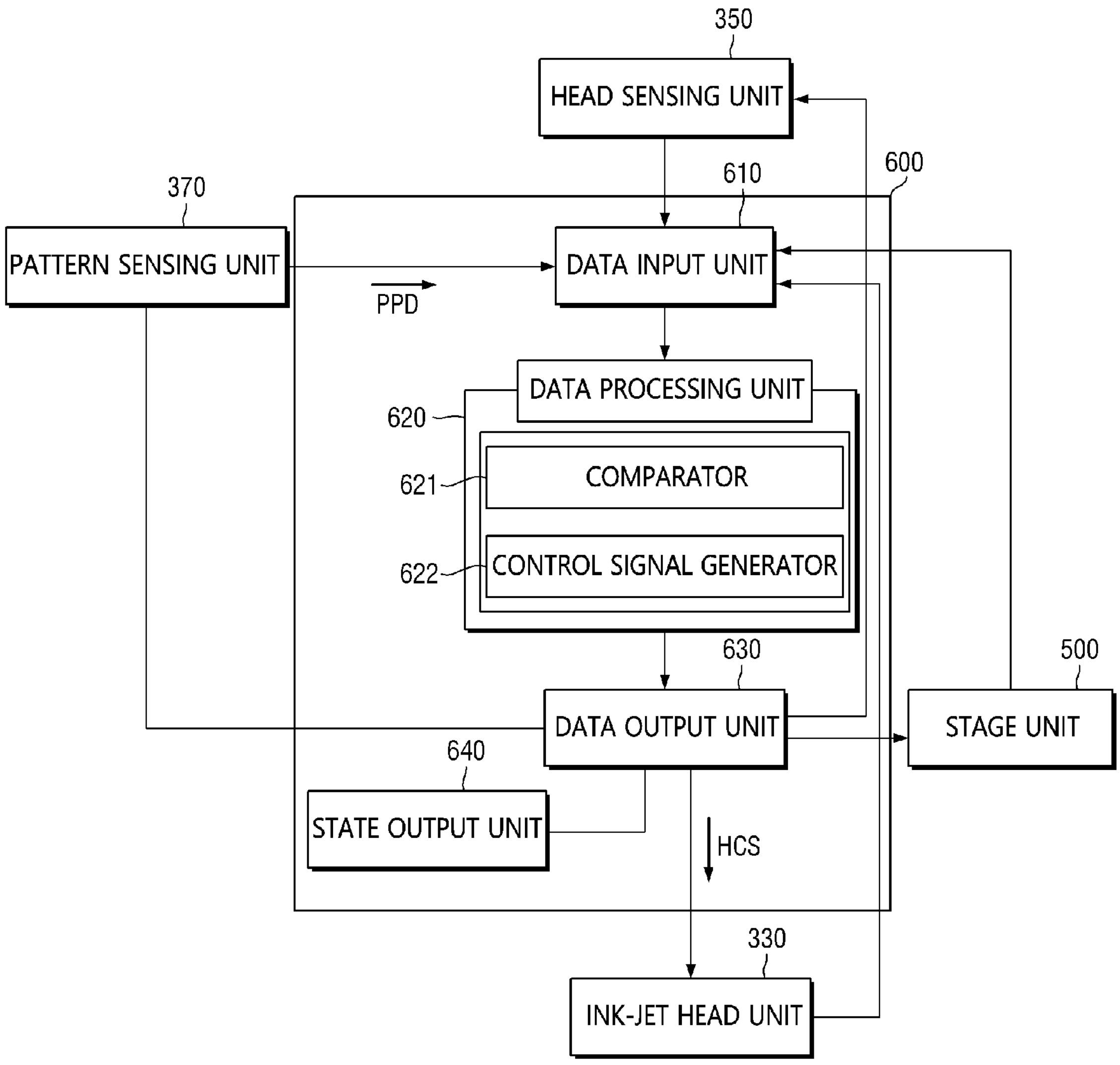
FIG. 10 is a schematic block diagram illustrating an embodiment of a structure of a control device.

The control device 600 may include a data input unit 610, a data processing unit 620, a data output unit 630, and a state output unit 640 (refer to FIG. 10).

The control device 600 may control an operating state of each member constituting the ink-jet printing apparatus 1000 throughout the printing process and the inspection process. The control device 600 may collect and analyze data received from each member of the ink-jet printing apparatus 1000 to generate various control signals for controlling each member. The control device 600 may output the generated control signals to control each member of the ink-jet printing apparatus 1000.

As described above, with the ink-jet printing apparatus 1000 according to the disclosure, it is possible to continuously perform the inspection process of the ink-jet printing apparatus 1000 using the pattern sensing unit 370 and the head sensing unit 350 and the printing process using the ink-jet head unit 330. As a result, an inspection may be quickly performed even during a process regardless of a printing process sequence, such that process efficiency of the ink-jet printing apparatus 1000 may be increased.

Hereinafter, the ink-jet head unit 330, the head sensing unit 350, the pattern sensing unit 370, the stage unit 500, and the control device 600 will be described in more detail with reference to FIGS. 5 to 10.

Figure 5:
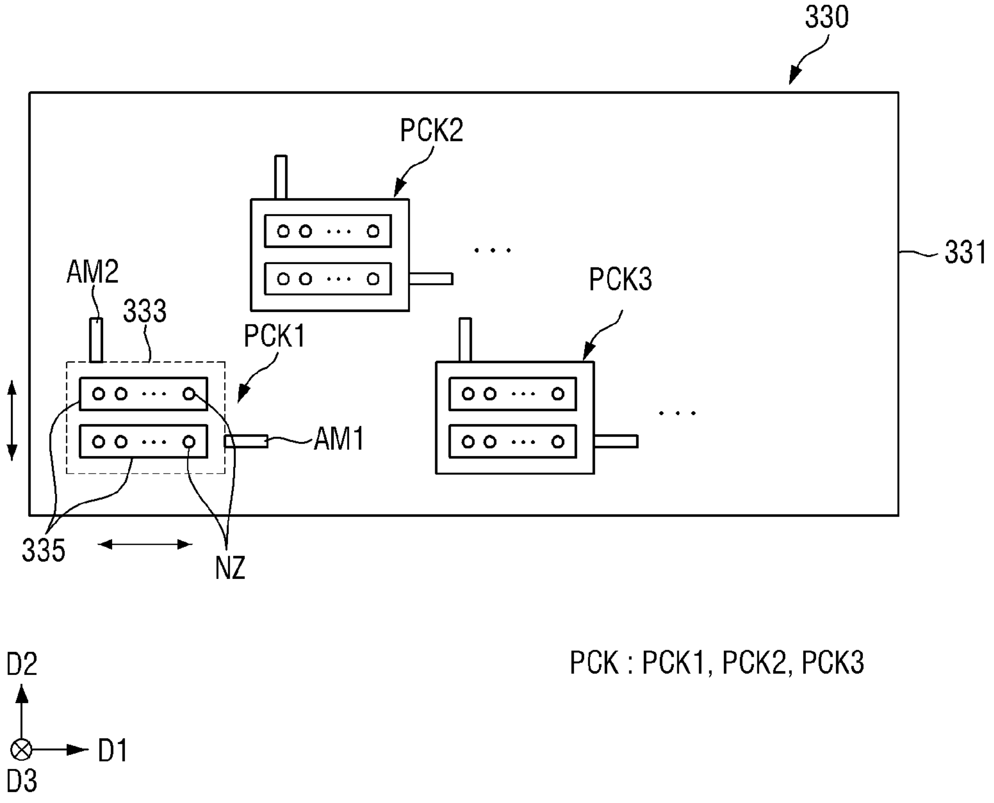
FIG. 5 is a bottom view of an embodiment of an ink-jet head unit.

FIG. 5 is a bottom view of an embodiment of an ink-jet head unit.

FIG. 5 is a bottom view of the ink-jet head unit 330 viewed from the other side in the third direction D3, that is, from the bottom.

Referring to FIGS. 2 and 5, the ink-jet head unit 330 may be disposed above the stage unit 500 and be spaced apart from the stage unit 500 by a predetermined distance. A distance between the ink-jet head unit 330 and the stage unit 500 spaced apart from each other may be adjusted in a range in which the ink-jet head unit 330 has a predetermined interval from the target substrate SUB when the target substrate SUB are disposed on the stage unit 500, such that a printing process space may be secured.

The ink-jet head unit 330 may include a head base 331, a plurality of jig parts 333 disposed on a lower surface of the head base 331, and at least one ink-jet head 335 disposed on each of the jig parts 333 and including a plurality of nozzles NZ.

The head base 331 of the ink-jet head unit 330 may be disposed (e.g., mounted) on the first horizontal support part 311 of the first support 310, and may be disposed above the stage unit 500 and be spaced apart from the stage unit 500 by a predetermined distance. The head base 331 may have a shape in which it extends in the first direction D1. The head base 331 may further include a moving member (not illustrated) to move in an extension direction of the first horizontal support part 311, that is, in the first direction D1.

The plurality of jig parts 333 may be disposed on one surface of the head base 331, e.g., the lower surface of the head base 331. At least one ink-jet head 335 may be disposed on each jig part 333. The plurality of jig parts 333 may be spaced apart from each other in one direction. The plurality of jig parts 333 may be disposed in one direction and be arranged in one row or a plurality of rows. It has been illustrated in the drawings that the jig parts 333 are disposed in two rows, and the jig parts 333 of respective rows are staggered. However, the disclosure is not limited thereto, and the jig parts 333 may be arranged in one row or a larger number of rows and may overlap each other without being staggered. A shape of the jig part 333 is not particularly limited, and in an embodiment, the jig part 333 may have a quadrangular (e.g., rectangular) shape.

The ink-jet head unit 330 may further include a plurality of head driving parts AM1 and AM2 capable of moving the respective jig parts 333 in one direction and the other direction (e.g., the first direction D1 and the second direction D2). The plurality of head driving parts AM1 and AM2 may adjust positions of the respective jig parts 333 and an interval between the respective jig parts 333. By adjusting the interval between the jig parts 333 using the head driving parts AM1 and AM2, impact positions of the inks I ejected from the ink-jet heads 335 disposed on the jig parts 333 may be adjusted.

The plurality of head driving parts may include a first head driving part AM1 disposed in the first direction D1 of the jig part 333 and a second head driving part AM2 disposed in the second direction D2 of the jig part 333. The first head driving part AM1 may be a driving part moving the jig part 333 and the ink-jet heads 335 in the first direction D1 or an X-axis direction in order to align the jig part 333 and the ink-jet heads 335. The second head driving part AM2 may be a driving part moving the jig part 333 and the ink-jet heads 335 in the second direction D2 or a Y-axis direction in order to align the jig part 333 and the ink-jet heads 335.

A plurality of ink-jet heads 335 may be disposed on the jig part 333. The plurality of ink-jet heads 335 may be coupled and fixed to the jig part 333. Two or more ink-jet heads 335 disposed on the same jig part 333 among the plurality of ink-jet heads 335 may form at least one pack PCK. It has been illustrated in FIG. 5 that two ink-jet heads 335 form one pack PCK and are disposed on one jig part 333. However, the number of ink-jet heads 335 included in one pack PCK is not limited thereto, and in an embodiment, the number of ink-jet heads 335 included in one pack PCK may be 1 to 5.

The ink-jet head unit 330 may further include ahead control line HCL (refer to FIG. 14) connected to the data output unit 630 of the control device 600. The head control line HCL may provide a head control signal HCS (refer to FIG. 14) in order to adjust an ink ejection timing of each ink-jet head 335. However, the disclosure is not limited thereto, and not only a wired connection through a physical line but also a wireless connection through radio waves or the like is possible as long as the data output unit 630 may provide the head control signal HCS to the ink-jet head unit 330.

A process in which the control device 600 adjusts the ink ejection timing of the ink-jet head 335 through the head control line HCL will be described later with reference to other drawings.

In an embodiment, as illustrated in FIG. 5, an interval between two packs PCK disposed in the same row and adjacent to each other in the first direction D1 may be greater than a length of one pack PCK in the first direction D1. Accordingly, in FIG. 5, packs PCK disposed in a lower row and packs PCK disposed in an upper row may be staggered without overlapping each other in the second direction D2. However, the disclosure is not limited thereto, and an interval between two packs PCK disposed in the same row and adjacent to each other in the first direction D1 may also be smaller than a length of one pack PCK in the first direction D1. In this case, in FIG. 5, packs PCK disposed in a lower row and packs PCK disposed in an upper row may overlap with each other and be staggered in the second direction D2. However, as described above, the plurality of jig parts 333 may be arranged in one row or a larger number of rows, and thus, a plurality of packs PCK may also be arranged in one row or a greater number of rows.

One ink-jet head unit 330 has been illustrated in the drawings, but the disclosure is not limited thereto. In an embodiment, in a process of providing a plurality of types of inks I to the target substrate SUB, the same number of ink-jet head units 330 as the types of inks I may be disposed, for example. In addition, it has been illustrated in the drawings that one ink-jet head unit 330 includes several jig parts 333 and ink-jet heads 335, but the numbers of jig parts 333 and ink-jet heads 335 included in the ink-jet head unit 330 are not limited thereto.

Figure 6:
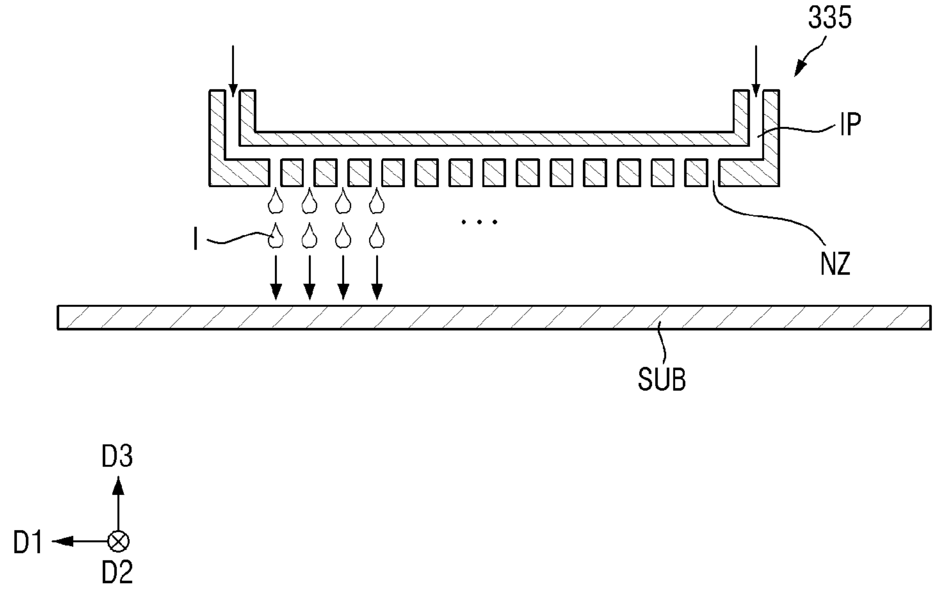
FIG. 6 is a cross-sectional view of an embodiment of an ink-jet head and a target substrate.

FIG. 6 is a cross-sectional view of an embodiment of an ink-jet head and a target substrate.

FIG. 6 is a cross-sectional view of the ink-jet head unit 330 and the target substrate SUB viewed from the second direction D2. FIG. 6 illustrates that the ink is ejected from the ink-jet head 335.

The ink-jet head unit 330 may be connected to a separate ink reservoir (not illustrated) to receive the ink I, and may eject the ink I onto the target substrate SUB through an ink-jet head 335 to be described later.

Referring to FIG. 6, the ink-jet head 335 may include an inner tube IP and a plurality of nozzles NZ. Each nozzle NZ disposed on a lower surface of the ink-jet head 335 may be connected to the inner tube IP of the ink-jet head 335. The ink-jet head 335 may receive the ink I supplied from the head base 331 through the inner tube IP, and the received ink I may flow through the inner tube IP and be ejected through each nozzle NZ. The ink I ejected through each nozzle NZ may be supplied to an upper surface of the target substrate SUB.

An amount of the ink I ejected through the nozzle NZ may be adjusted according to a voltage applied to each nozzle NZ. In an embodiment, an amount of the ink I ejected once from each nozzle NZ may be about 1 picolitter (pl) to about 50 pl, but is not limited thereto.

Only some of the plurality of nozzles NZ may be selected according to a process, and the ink I may be ejected through the selected nozzles NZ. Whether or not the ink I is ejected through the nozzles NZ may be adjusted according to the voltage applied to each nozzle NZ. It has been illustrated in FIG. 6 that the ink I is ejected from only four nozzles, but the disclosure is not limited thereto, and all of the nozzles NZ may be selected, and the ink may be ejected from all of the nozzles NZ.

Figure 7:
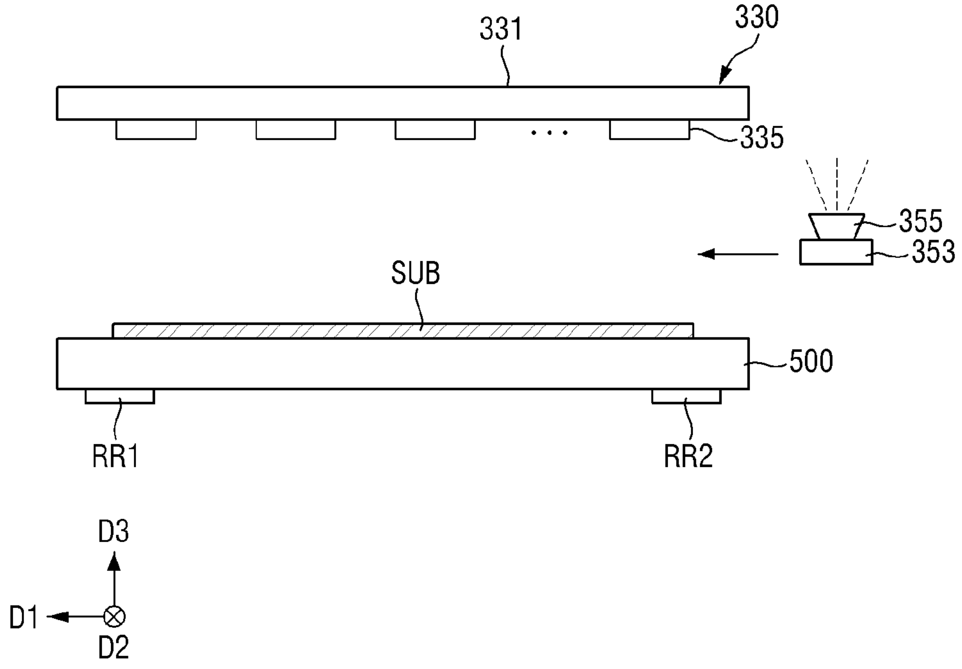
FIG. 7 is a cross-sectional view of an embodiment of a head sensing unit, the ink-jet head unit, and the target substrate.

FIG. 7 is a cross-sectional view of an embodiment of a head sensing unit, the ink-jet head unit, and the target substrate.

FIG. 7 is a cross-sectional view of the head sensing unit 350, the ink-jet head unit 330, and the target substrate SUB viewed from the second direction D2. FIG. 7 illustrates that the head sensing unit 350 scans the ink-jet head unit 330.

Referring to FIGS. 2 and 7, the head sensing unit 350 may be disposed (e.g., mounted) on the first support 310. The head sensing unit 350 may serve to scan the ink-jet head unit 330 in order to inspect a degree of alignment of ink ejection members included in the ink-jet head unit 330, amounts of the ejected ink I, or the like. In addition, the head sensing unit 350 may be used to inspect whether or not the nozzle NZ of the ink-jet head 335 is clogged.

The head sensing unit 350 may include a head sensor moving part 351, a head sensor support part 353 disposed on one surface of the head sensor moving part 351, and a head sensor part 355 disposed on the head sensor support part 353.

The head sensor moving part 351 may be disposed (e.g., mounted) on the first horizontal support part 311. The head sensor moving part 351 may move in the first direction D1, which is an extension direction of the ink-jet head unit 330. The head sensor moving part 351 may serve to move the head sensor part 355 in the first direction D1, which is the extension direction of the ink-jet head unit 330.

The head sensor support part 353 may be disposed below the head sensor moving part 351 and may have a shape in which it extends in the second direction D2. One end of the head sensor support part 353 may be connected to the head sensor moving part 351, and the head sensor part 355 may be disposed on an upper surface of the other end of head sensor support part 353 in the second direction D2. The head sensing unit 350 may protrude from the first support 310 in the second direction D2. In an embodiment, the head sensing unit 350 may protrude from one side of the first horizontal support part 311 in the second direction D2, similar to the ink-jet head unit 330, for example.

The head sensor part 355 may be disposed on an upper surface of the head sensor support part 353. The head sensor part 355 may face the ink-jet head 335 below the ink-jet head 335.

The head sensor part 355 may move along the extension direction of the ink-jet head unit 330 by the head sensor moving part 351. The head sensor part 355 may inspect positions or alignment states of the ink-jet heads 335 disposed on a lower surface of the ink-jet head unit 330 while moving along the extension direction of the ink-jet head unit 330 below the lower portion of the ink-jet head unit 330. In addition, the head sensor part 355 may monitor amounts of the ink I ejected from the ink-jet head 335, stains or dried ink I generated on the ink-jet heads 335, or the like.

The head sensor part 355 including one sensing member has been illustrated in the drawings, but the disclosure is not limited thereto. The head sensor part 355 may have various shapes in order to inspect a degree of alignment of the ink-jet heads 335. In an embodiment, when the ink-jet heads 335 are arranged in a plurality of rows, the head sensor part 355 may also include a plurality of sensing members, which may be arranged in a plurality of rows, for example.

Figure 8:
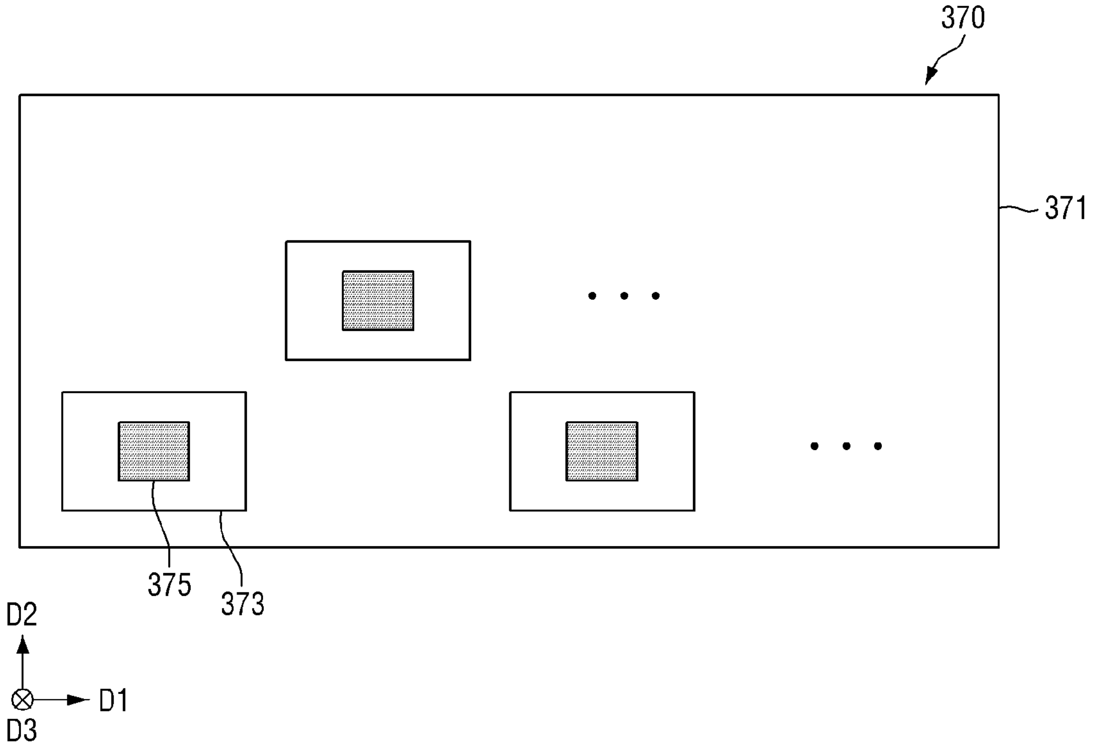
FIG. 8 is a bottom view of an embodiment of a pattern sensing unit.

FIG. 8 is a bottom view of an embodiment of a pattern sensing unit.

Referring to FIGS. 2 and 8, the pattern sensing unit 370 may be disposed (e.g., mounted) on the first horizontal support part 311 of the first support 310, and may protrude from the other side of the first horizontal support part 311 in the second direction D2. Accordingly, the first horizontal support part 311 of the first support 310 may be disposed between the ink-jet head unit 330 and the pattern sensing unit 370. However, the disclosure is not limited thereto, and as described above, the ink-jet head unit 330 and the pattern sensing unit 370 may protrude from the same side of one side or the other side of the first horizontal support part 311 in the second direction D2.

The pattern sensing unit 370 may be disposed above the stage unit 500 and be spaced apart from the stage unit 500 by a predetermined distance. A distance between the pattern sensing unit 370 and the stage unit 500 spaced apart from each other may be adjusted in a range in which the pattern sensing unit 370 has a predetermined interval from the target substrate SUB when the target substrate SUB are disposed on the stage unit 500, such that a space for scanning an image of the target substrate SUB may be secured.

One pattern sensing unit 370 has been illustrated in the drawings, but the disclosure is not limited thereto. In an embodiment, when a plurality of ink-jet head units 330 is disposed, a plurality of pattern sensing units 370 may be disposed so as to correspond to the plurality of ink-jet head units 330, for example.

The pattern sensing unit 370 may scan the target substrate SUB on which the ink I is ejected and a predetermined pattern is printed. That is, the pattern sensing unit 370 may scan the target substrate SUB on which the predetermined pattern is printed through an image device such as a high-resolution camera. The pattern sensing unit 370 may convert a scanned image into data and transfer the data to the control device 600. In an embodiment, the pattern sensing unit 370 may provide printing pattern information PPD of the predetermined pattern printed on the target substrate SUB to the control device 600.

The pattern sensing unit 370 may include a pattern sensor base 371, a plurality of pattern sensor support parts 373 disposed on a lower surface of the pattern sensor base 371, and at least one pattern sensor part 375 disposed on each of the pattern sensor support parts 373.

The pattern sensor base 371 of the pattern sensing unit 370 may be disposed (e.g., mounted) on the first horizontal support part 311 of the first support 310, and may be disposed above the stage unit 500 and be spaced apart from the stage unit 500 by a predetermined distance. The pattern sensor base 371 may have a shape in which it extends in the first direction D1. The pattern sensor base 371 may further include a moving member (not illustrated) to move in the extension direction of the first horizontal support part 311, that is, in the first direction D1.

The plurality of pattern sensor support parts 373 may be disposed on one surface of the pattern sensor base 371, e.g., the lower surface of the pattern sensor base 371. At least one pattern sensor part 375 may be disposed on each pattern sensor support part 373.

The plurality of pattern sensor support parts 373 may be disposed on the same line extending in the first direction D1 as the plurality of jig parts 333 of the ink-jet head unit 330, respectively. In addition, the number of pattern sensor support parts 373 may be the same as the number of jig parts 333. That is, the plurality of pattern sensor support parts 373 may correspond to the plurality of jig parts 333 disposed on the same line in a one-to-one manner.

Accordingly, the plurality of pattern sensor support parts 373 may be spaced apart from each other in one direction, similar to the plurality of jig parts 333 described above. The plurality of pattern sensor support parts 373 may be disposed in one direction and be arranged in one row or a plurality of rows. It has been illustrated in the drawings that the pattern sensor support parts 373 are disposed in two rows, and the pattern sensor support parts 373 of respective rows are staggered. However, the disclosure is not limited thereto, and the pattern sensor support parts 373 may be arranged in a larger number of rows and may overlap each other without being staggered. A shape of the pattern sensor support part 373 is not particularly limited, and in an embodiment, the pattern sensor support part 373 may have a quadrangular (e.g., rectangular) shape.

The pattern sensor part 375 is disposed on the pattern sensor support part 373. At least one pattern sensor part 375 may be disposed on the pattern sensor support part 373. It has been illustrated in FIG. 8 that one pattern sensor part 375 is disposed on one pattern sensor jig part 333. However, an arrangement and the number of pattern sensor parts 375 are not limited thereto, and may be determined according to an arrangement and the number of packs PCK.

In an embodiment, the pattern sensor part 375 may be a high-resolution camera. When the pattern sensor part 375 is the high-resolution camera, the pattern sensor part 375 may be disposed above the target substrate SUB and may capture an image of the target substrate SUB disposed below the pattern sensor part 375 and inspect whether the ink I ejected onto the target substrate SUB has been correctly impacted or falsely impacted or a shape of a predetermined pattern. However, the pattern sensor part 375 is not limited to the high-resolution camera as long as it is a device capable of inspecting whether the ink I ejected onto the target substrate SUB has been correctly impacted or falsely impacted or the shape of the predetermined pattern.

The pattern sensor parts 375 may be disposed on the same line extending in the first direction D1 as the packs PCK of the ink-jet head unit 330, respectively. In addition, the number of pattern sensor parts 375 may be the same as the number of packs PCK of the ink-jet head unit 330. That is, the pattern sensor parts 375 may correspond to the packs PCK disposed on the same line in a one-to-one manner.

The pattern sensor part 375 may inspect the target substrate SUB on which a predetermined pattern is printed by the ink-jet head 335 of the pack PCK disposed on the same line extending in the first direction D1.

As described above, with the ink-jet printing apparatus 1000 according to the disclosure, it is possible to individually inspect the target substrate SUB on which the predetermined patterns are printed by the respective packs PCK by allowing the pattern sensor parts 375 to correspond to the packs PCK of the ink-jet head unit 330 in the one-to-one manner. Accordingly, it is possible to increase process efficiency by saving a time desired for scanning the entirety of the target substrate SUB.

FIG. 9 is a plan view of an embodiment of a stage unit.

Referring to FIGS. 2 and 9, the stage unit 500 may include abase frame 510, a stage 520, and aligners 580.

The base frame 510 may support members included in the stage unit 500. In an embodiment, the stage 520 may be disposed on the base frame 510, for example.

The base frame 510 may be disposed on the first rail RR1 and the second rail RR2, and may reciprocate while moving in the second direction D2 within the ink-jet printing apparatus 1000. Although not illustrated in the drawings, a predetermined moving member may be disposed on a lower surface of the base frame 510, and may be fastened to the first and second rails RR1 and RR2 to move the base frame 510 in one direction. The base frame 510 may be moved according to a process sequence of the ink-jet printing apparatus 1000, and respective units or devices may be driven according to the movement of the base frame 510 during a process of the ink-jet printing apparatus 1000.

The stage 520 may be disposed on the base frame 510. The stage 520 may provide a space in which the target substrate SUB is disposed. In addition, the aligners 580 may be disposed on the stage 520.

An overall shape of the stage 520 in a plan view may follow a shape of the target substrate SUB in a plan view. In an embodiment, when the target substrate SUB has a quadrangular (e.g., rectangular) shape in a plan view, the stage 520 may have a quadrangular (e.g., rectangular) shape in a plan view as illustrated in the drawings, and when the target substrate SUB has a circular shape in a plan view, the stage 520 may also have a circular shape in a plan view, for example. In the drawings, the stage unit 500 having a quadrangular (e.g., rectangular) shape having short sides disposed in the first direction D1 and long sides disposed in the second direction D2 has been illustrated. However, a shape of the stage unit 500 is not limited thereto, and may be modified depending on the shape of the target substrate SUB in a plan view as described above.

The aligners 580 may be installed on the stage 520 in order to align the target substrate SUB disposed on the stage 520. The aligners 580 may be disposed on each side of the stage 520, and an area surrounded by a plurality of aligners 580 may be an area in which the target substrate SUB is disposed. It has been illustrated in the drawings that two aligners 580 are spaced apart from each other on each side of the stage 520, such that a total of eight aligners 580 are disposed on the stage 520, but the disclosure is not limited thereto, and the number, an arrangement, or the like, of aligners 580 may vary depending on a shape or a type of the target substrate SUB.

In some embodiments, the stage unit 500 may further include the probe unit 550. In an embodiment, when a dipole (not illustrated) is included in the ink I, the probe unit 550 may generate an electric field on the target substrate SUB in order to adjust an orientation direction and a position of the dipole.

The probe unit 550 may be disposed on the base frame 510. The probe unit 550 may serve to generate the electric field on the target substrate SUB prepared on the stage 520. The probe unit 550 may extend in the second direction D2, and may extend at a length enough to cover the entirety of the target substrate SUB. A size and a shape of the probe unit 550 may vary depending on the target substrate SUB.

The probe unit 550 may include a probe driving part 553 capable of moving a probe pad 558, the probe pad 558 connected to the probe driving part 553 and capable of contacting the target substrate SUB, and a plurality of probe jigs 551 connected to the probe pad 558 and transferring an electrical signal.

It has been illustrated in the drawings that the probe unit 550 is included in the stage unit 500 and is disposed on the base frame 510, but the probe unit 550 may also be disposed as a separate device in some cases. As long as the stage unit 500 may generate the electric field on the target substrate SUB by including a device capable of generating the electric field, a structure or an arrangement of the stage unit 500 is not limited.

FIG. 10 is a schematic block diagram illustrating an embodiment of a structure of a control device.

The control device 600 may include the data input unit 610, the data processing unit 620, and the data output unit 630.

The data input unit 610 may collect information on an operating state of each member of the ink-jet printing apparatus 1000. The data input unit 610 may perform data pre-processing so that the data processing unit 620 may calculate the collected information. In an embodiment, the data input unit 610 of the control device 600 may collect and pre-process head state information obtained by the head sensing unit 350 scanning the ink-jet head 335. In another embodiment, the data input unit 610 may collect and pre-process the printing pattern information PPD collected by the pattern sensing unit 370 scanning the target substrate SUB.

The data processing unit 620 may be in charge of a calculation function and a control signal generation function for controlling the overall operating state of each member of the ink-jet printing apparatus 1000.

A calculation process of the data processing unit 620 may include all processes of analyzing pre-processed information and comparing the pre-processed information with stored existing information. However, the disclosure is not limited thereto, and other processes may be further included in the calculation process of the data processing unit 620.

In some embodiments, the data processing unit 620 may include a comparator 621. The comparator 621 may store previously input information on the overall operating state of each member. The comparator 621 may compare the stored information with newly input information.

In an embodiment, the comparator 621 may compare printing pattern information PPD collected from the pattern sensing unit 370 and previously stored with newly input printing pattern information PPD. The comparator 621 may analyze the pre-processed image and compare the analyzed image with an alignment state, amounts of ejected ink, states of ejected ink, or the like, of the existing ink-jet heads 335.

The data processing unit 620 may generate a control signal for controlling each member of the ink-jet printing apparatus 1000 based on the compared data.

In some embodiments, the data processing unit 620 may include a control signal generator 622. The control signal generator 622 may generate the control signal for controlling each member of the ink-jet printing apparatus 1000.

In an embodiment, the control signal generator 622 may generate a head control signal HCS capable of adjusting an ink ejection timing of the ink-jet head 335. The head control signal HCS may be generated based on the printing pattern information PPD collected by the pattern sensing unit 370.

The head control signal HCS may include a plurality of ejection sections and a plurality of non-ejection sections that are alternately repeated. The plurality of ejection sections refer to sections in which a voltage is applied so that the ink-jet head 335 ejects the ink, and the plurality of non-ejection sections refer to sections in which a voltage is not applied so that the ink-jet head 335 does not eject the ink.

The data output unit 630 may transfer the control signal received from the data processing unit 620 to each member of the ink-jet printing apparatus 1000. In an embodiment, the data output unit 630 may transfer the head control signal HCS to each ink-jet head 335 or pack PCK of the ink-jet head unit 330. The ink-jet head 335 or the pack PCK of the ink-jet head unit 330 that has received the head control signal HCS may eject the ink according to the printing pattern information PPD, which is a basis of the head control signal HCS.

In some embodiments, the control device 600 may further include the state output unit 640 capable of monitoring an operating state, an inspection result, or the like, of the ink-jet printing apparatus 1000 in real time.

The state output unit 640 may output the operating state of each member of the ink-jet printing apparatus 1000 through an output device such as a monitor so that a user of the ink-jet printing apparatus 1000 may confirm the operating state of each member of the ink-jet printing apparatus 1000 in real time.

The control device 600 may control an operating state of each member constituting the ink-jet printing apparatus 1000 throughout the printing process and the inspection process.

The control device 600 may collect information on the operating state of each member of the ink-jet printing apparatus 1000 through the data input unit 610. The control device 600 may compare and calculate the data collected through the data processing unit 620 to generate various control signals capable of controlling each member of the ink-jet printing apparatus 1000. The control device 600 may output and transfer the generated control signal through the data output unit 630 to control each member of the ink-jet printing apparatus 1000.

Hereinafter, a method of generating a transformed pattern TPN by the control device 600 in an embodiment will be described with reference to FIGS. 11A to 13B.

Figure 11A:
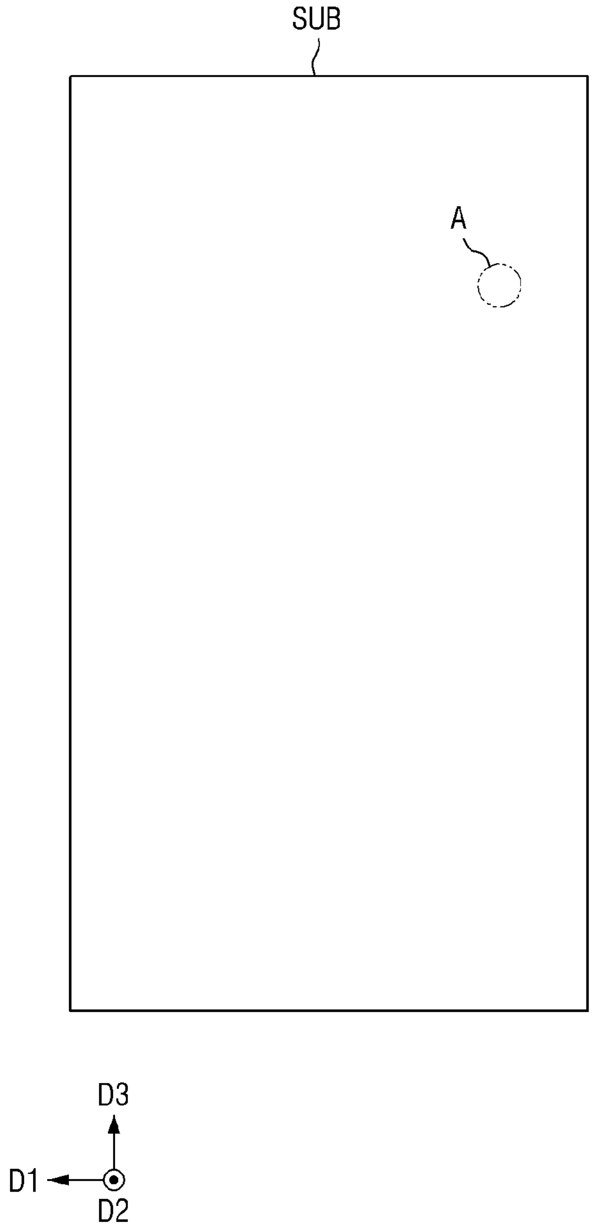
FIG. 11A is a plan view of an embodiment of the target substrate.
Figure 11B:
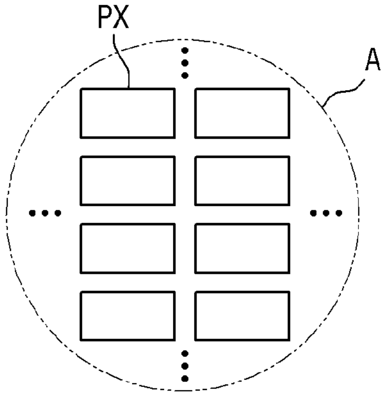
FIG. 11B is an enlarged view of the area 'A' of FIG. 11A.
Figure 12:
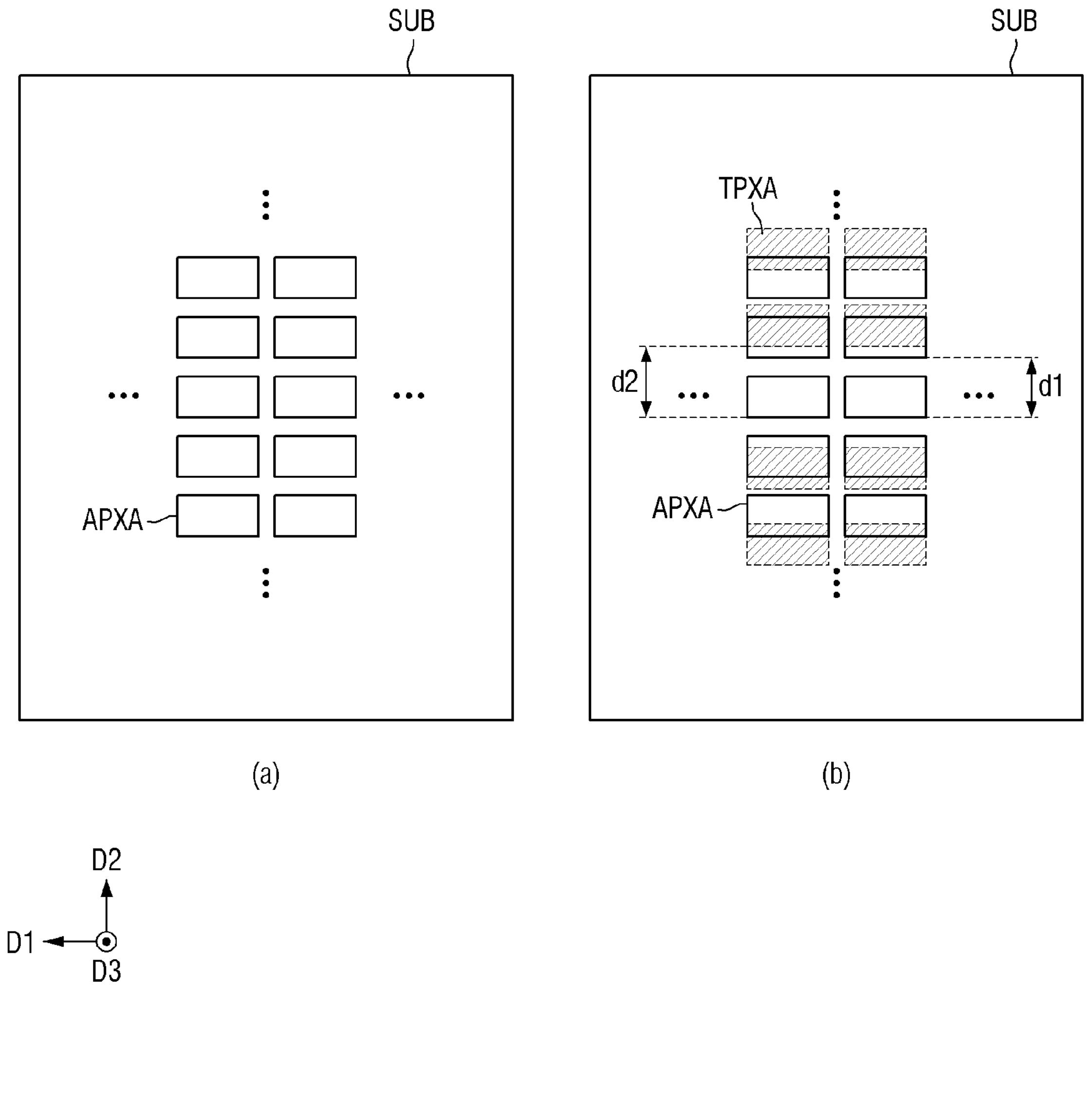
FIGS. 12 and 13 are conceptual diagrams for describing a method of generating a transformed pattern.
Figure 13:
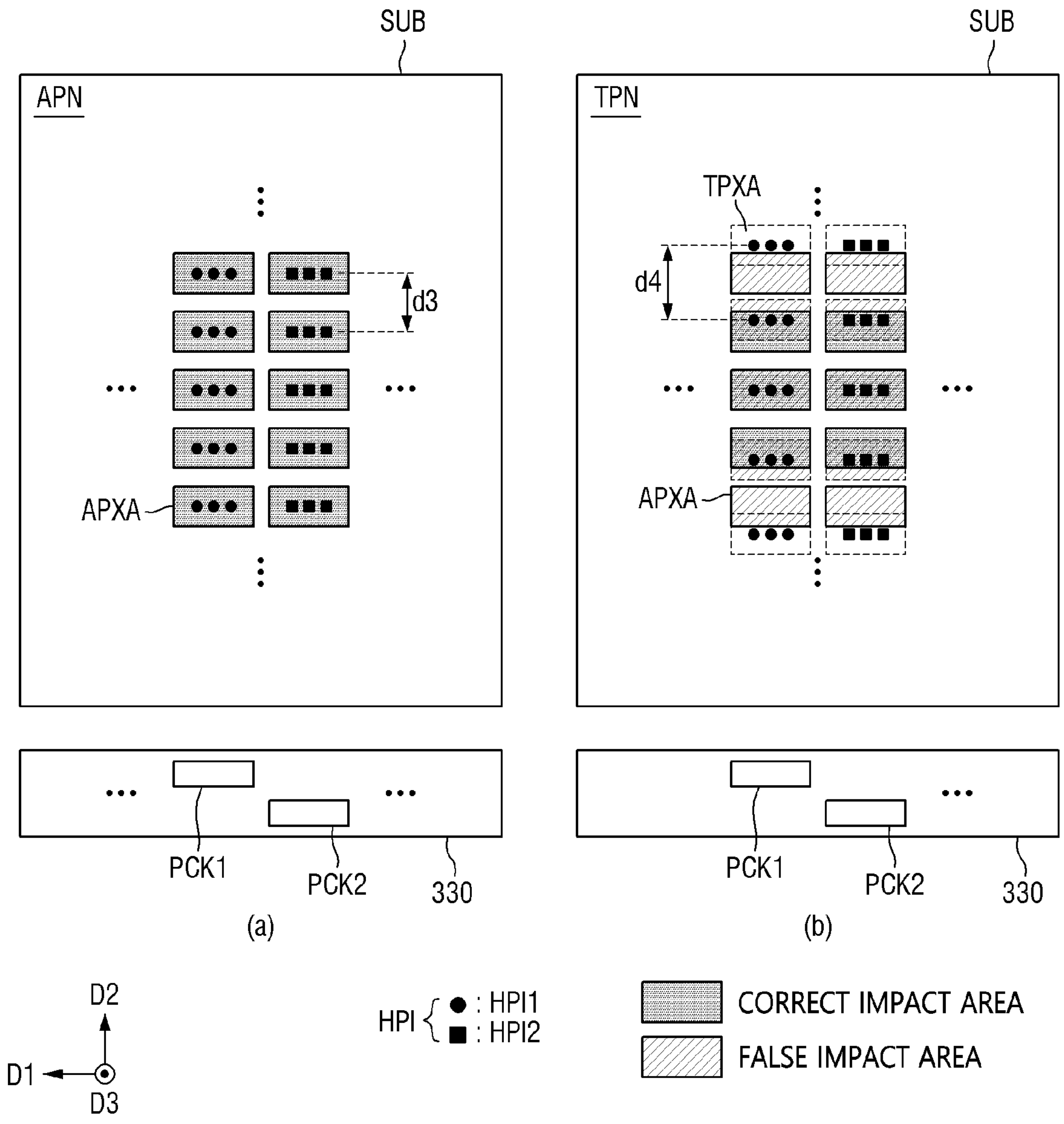

FIG. 11A is a plan view of an embodiment of the target substrate. FIG. 11B is an enlarged view of the area 'A' of FIG. 11A. FIGS. 12 and 13 are conceptual diagrams for describing an embodiment of a method of generating a transformed pattern.

The target substrate SUB may include a plurality of pixels PX. The plurality of pixels PX may be arranged in a matrix direction, that is, in the first direction D1 and the second direction D2. A shape of each pixel may be a quadrangular (e.g., rectangular) or square shape in a plan view. However, the disclosure is not limited thereto. Each pixel PX may include a light-emitting element including an organic element or an inorganic particle. The light-emitting element may be disposed in each pixel PX through an ink-jet printing process by the ink-jet printing apparatus 1000. In addition, each pixel PX may include a color filter. The color filter may be disposed in each pixel PX through the ink-jet printing process by the ink-jet printing apparatus 1000.

With the ink-jet printing apparatus according to the disclosure, by the same target substrate SUB as that in an actual printing process instead of using a separate inspection substrate, it is possible to increase the reliability of inspection of the ink-jet head 335.

FIG. 12 illustrates a case (a) in which a plurality of actual pixel areas APXA is included in the target substrate SUB, and a case (b) in which a plurality of transformed pixel areas TPXA is included in the target substrate SUB. Areas indicated by solid lines in FIG. 12 refer to the actual pixel areas APXA, and areas indicated by dotted lines in FIG. 12 refer to the transformed pixel areas TPXA.

The control device 600 may control an ink ejection timing so that the ink-jet heads 335 may correctly impact the ink I in the plurality of actual pixel areas APXA in the printing process.

Here, the correct impact refers to a case where the ink I is correctly impacted in a target pixel PX, and a case opposite to the above case is referred to as a false impact. That is, the correctly impacted ink I refers to the ink I completely impacted in the target pixel PX.

The plurality of actual pixel areas APXA refer to areas virtually set by the control device 600 so that the ink-jet heads 335 eject the ink I to the target substrate SUB according to a target pattern APN in the printing process. Accordingly, when the printing process is appropriately performed according to a set value of the control device 600, the plurality of actual pixel areas APXA may correspond to areas that are substantially the same as areas in which the plurality of pixels PX of the target substrate SUB are disposed.

The control device 600 may form the plurality of transformed pixel areas TPXA by stretching a first pattern distance d1, which is an interval between two actual pixel areas APXA adjacent to each other in the second direction D2, by a predetermined level.

The plurality of transformed pixel areas TPXA refer to areas virtually set by the control device 600 so that the ink-jet heads 335 eject the ink I to the target substrate SUB according to a transformed pattern TPN in the inspection process rather than the printing process. That is, the plurality of transformed pixel areas TPXA refer to areas virtually set by the control device 600 rather than areas formed by actually physically stretching the interval between the two pixels PX adjacent to each other in the second direction D2 in the target substrate SUB.

A second pattern distance d2, which is an interval between two transformed pixel areas TPXA adjacent to each other, may be greater than the first pattern distance d1. The second pattern distance d2 may be greater than the first pattern distance d1 by x times the first pattern distance d1 (here, x is a real number between 0 and 1). When x is 1, the interval between the two pixels may not be substantially stretched due to characteristics of each pixel that is constantly repeated, and thus, x may be a real number between 0 and 1.

FIG. 13 illustrates a state (a) in which the ink is ejected into the actual pixel areas APXA according to the target pattern APN, and a state (b) in which the ink is ejected to the transformed pixel areas TPXA according to the transformed pattern TPN.

In the printing process, the ink-jet heads 335 may eject the ink I to the plurality of actual pixel areas APXA according to the target pattern APN. The target pattern APN is a pattern formed by disposing printing droplets HPI of the ink-jet heads 335 ejected to the plurality of actual pixel areas APXA at regular intervals in the matrix direction, and refers to a pattern used in the printing process for actual product mass production.

In the inspection process, the ink-jet heads 335 may eject the ink I to the plurality of transformed pixel areas TPXA according to the transformed pattern TPN. The transformed pattern TPN is a pattern formed by disposing printing droplets HPI of the ink-jet heads 335 ejected to the plurality of transformed pixel areas TPXA at regular intervals in the matrix direction, and refers to a pattern used in the inspection process.

Accordingly, the transformed pattern TPN may be generated by stretching the target pattern APN in the second direction D2. Here, the stretch may mean that an ink ejection timing interval of the ink-jet heads 335 is increased by the control device 600, such that an interval between printing droplets HPI of two ink-jet heads adjacent to each other in the second direction D2 is increased.

In an embodiment, a fourth pattern distance d4, which is an interval between printing droplets HPI of two ink-jet heads adjacent to each other in the second direction D2 in the transformed pattern TPN, may be greater than a third pattern distance d3, which is an interval between printing droplets HPI of two ink-jet heads adjacent to each other in the second direction D2 in the target pattern APN. In addition, the fourth pattern distance d4 may be greater than the third pattern distance d3 by x times the third pattern distance d3 (here, x is a real number between 0 and 1).

Most of the inks I ejected according to the target pattern APN may be correctly impacted in the pixels PX of the target substrate SUB. Some of the inks I ejected according to the transformed pattern TPN may be actually correctly impacted in the pixels PX of the target substrate SUB, and the others of the inks I may be falsely impacted in the pixels PX of the target substrate SUB. That is, in the inspection process using the transformed pattern TPN, by stretching the target pattern APN in the second direction D2 by the control device 600 to generate the transformed pattern TPN and performing printing according to the generated transformed pattern TPN, it is possible to intentionally design correct impact areas/false impact areas CIA and FIA (refer to FIG. 17).

As described above, with the ink-jet printing apparatus 1000 according to the disclosure, it is possible to quantify a degree of deviation in an ink ejection timing for each pack PCK through the intentionally designed correct impact areas/false impact areas CIA and FIA, and the control device 600 may adjust the ink ejection timings of the ink-jet heads 335 based on such a result.

Hereinafter, a process in which the control device 600 in an embodiment adjusts ink ejection timings of the ink-jet heads will be described with reference to FIGS. 14 to 18.

Figure 14:
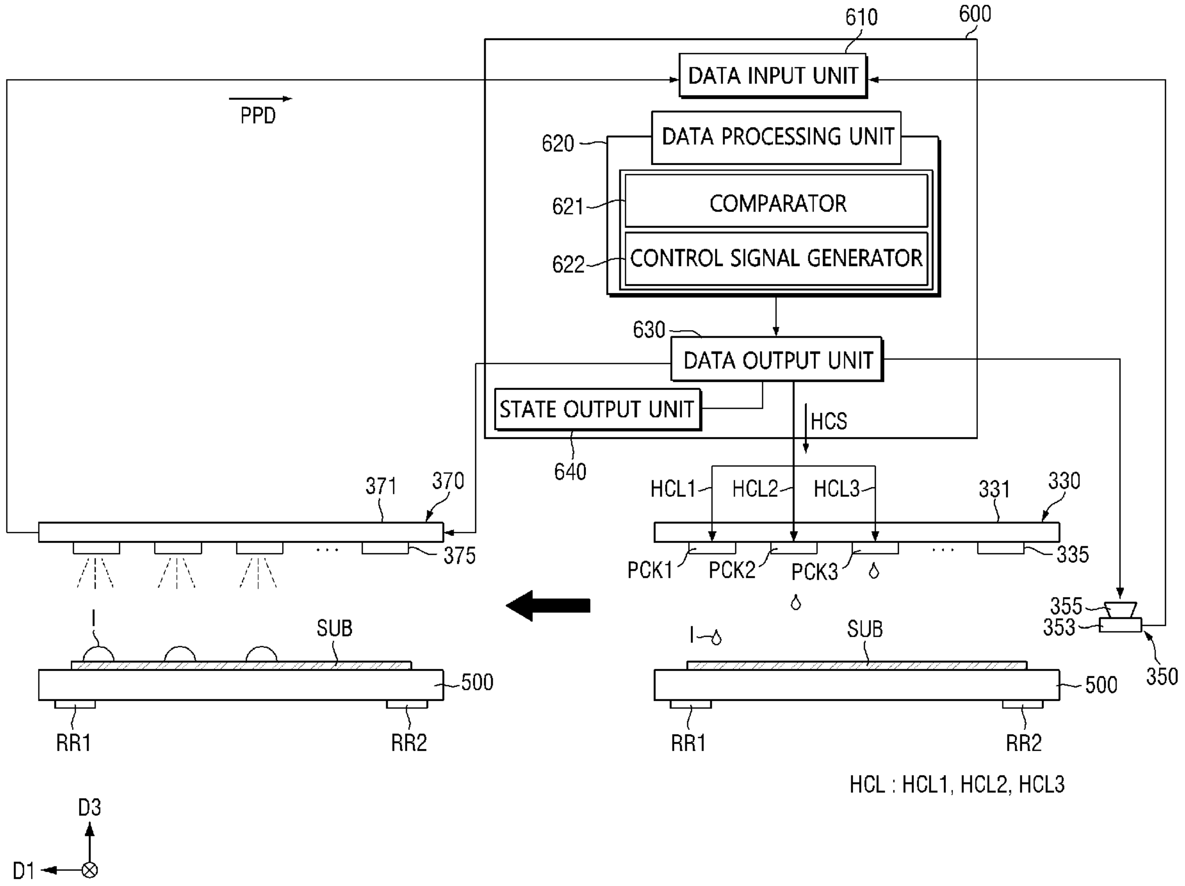
FIG. 14 is a conceptual diagram for describing an embodiment of a process in which the control device in an embodiment adjusts ink ejection timings of the ink-jet heads.
Figure 15:
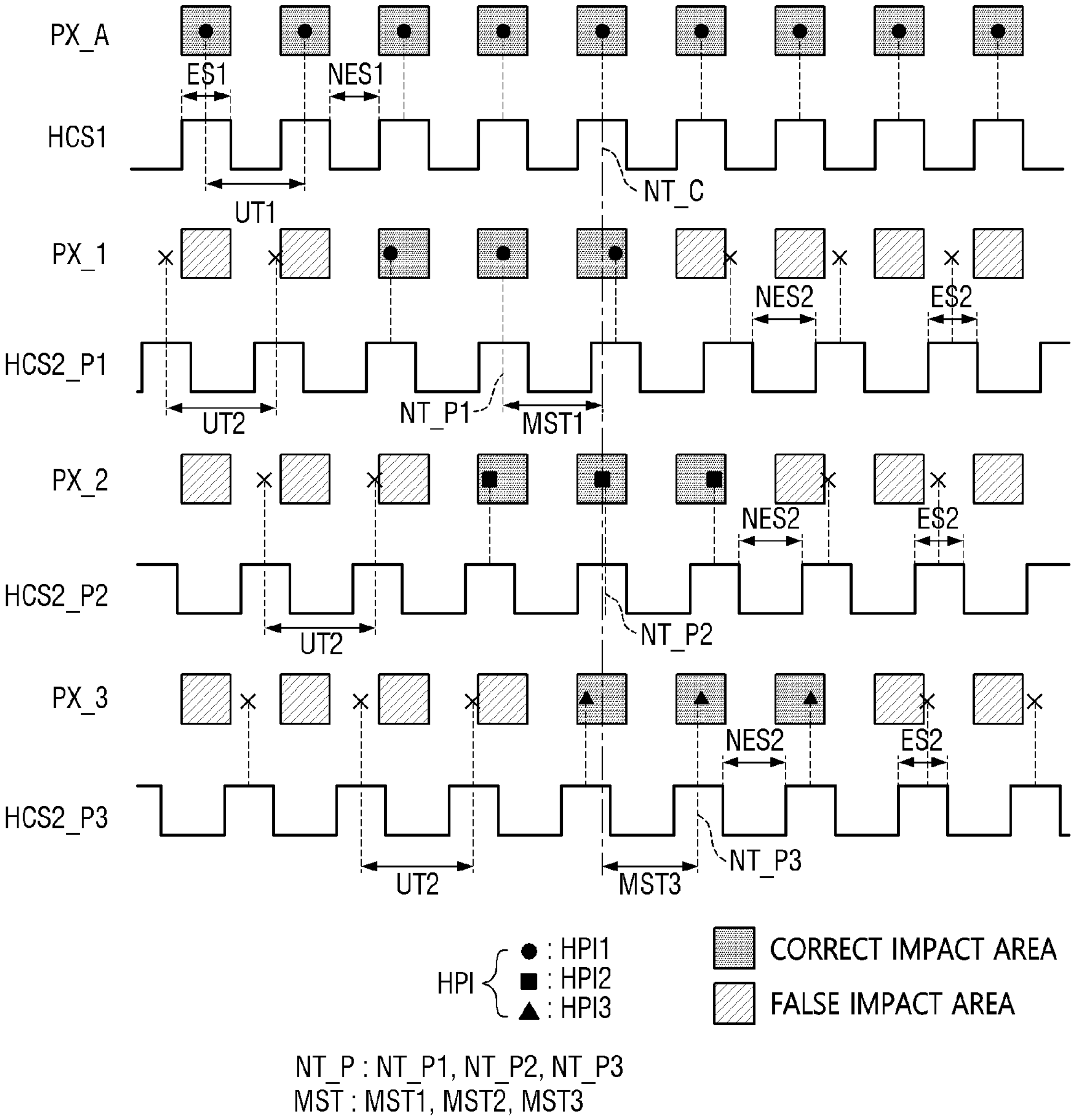
FIG. 15 is a timing diagram illustrating waveforms of an embodiment of head control signals in an embodiment of FIG. 14.
Figure 16:
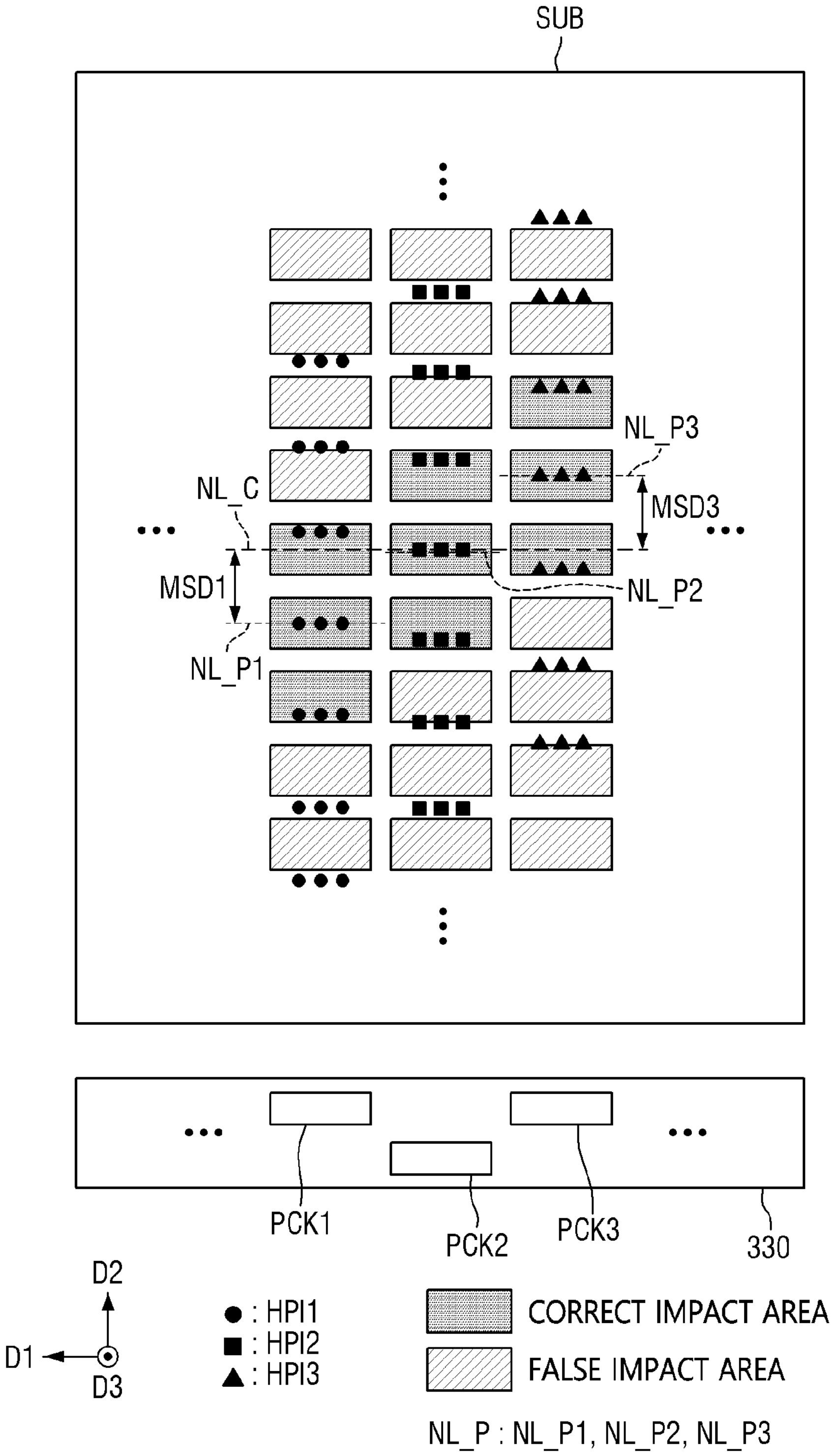
FIG. 16 is a conceptual diagram illustrating an embodiment of a target substrate printed according to the transformed pattern when ink ejection timings of the ink-jet heads deviate.
Figure 17:
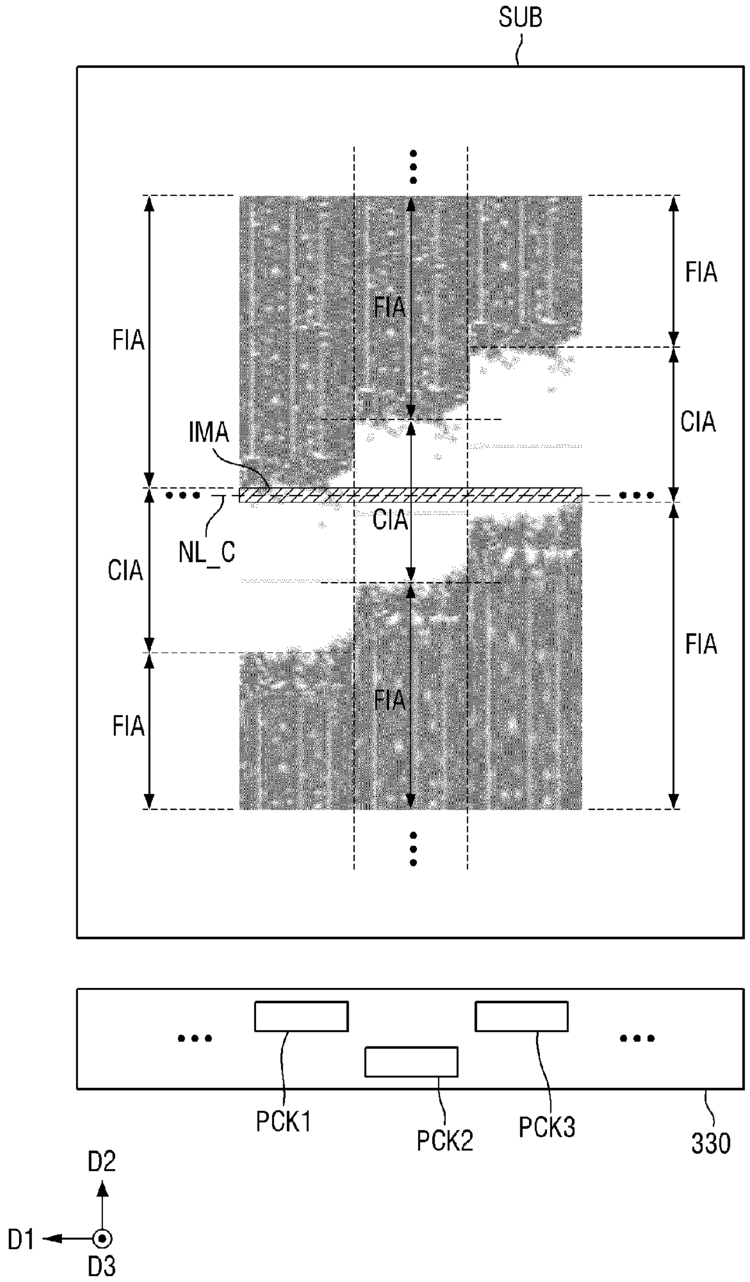
FIG. 17 is a conceptual diagram illustrating an impact inspection result of the target substrate of FIG. 16.
Figure 18:
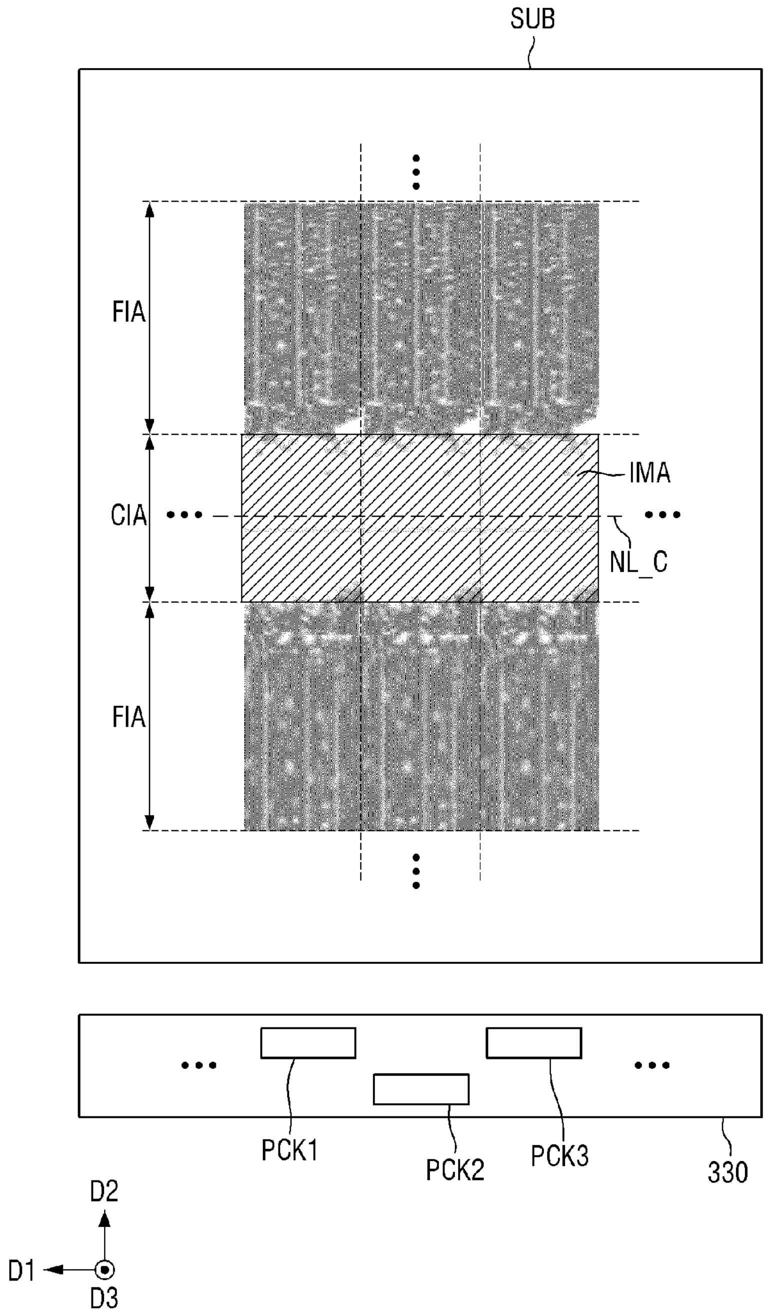
FIG. 18 is a conceptual diagram illustrating an impact inspection result of the target substrate after correctly correcting the ink ejection timings of the ink-jet heads of FIG. 16.

FIG. 14 is a conceptual diagram for describing a process in which the control device 600 adjusts ink ejection timings of the ink-jet heads 335. FIG. 15 is a timing diagram illustrating waveforms of head control signals of FIG. 14. FIG. 16 is a conceptual diagram illustrating a target substrate printed according to the transformed pattern when ink ejection timings of the ink-jet heads deviate. FIG. 17 is a conceptual diagram illustrating an impact inspection result of the target substrate of FIG. 16. FIG. 18 is a conceptual diagram illustrating an impact inspection result of the target substrate after correctly correcting the ink ejection timings of the ink-jet heads of FIG. 16.

Referring to FIGS. 14 to 18, it has been illustrated that the transformed pattern TPN is printed by the ink-jet heads 335 of three packs PCK. In addition, it has been illustrated that one head control line HCL controls one pack PCK. That is, it has been illustrated that a plurality of ink-jet heads 335 included in one pack PCK is controlled through one head control line HCL. However, the disclosure is not limited thereto, and one head control line HCL may also control one ink-jet head 335. Hereinafter, for convenience of explanation, an inspection method will be described with reference to an example illustrated in FIGS. 14 to 18.

In an embodiment, referring to FIGS. 14 to 17, a case where an ink ejection timing of a first pack PCK1 is faster than an ink ejection timing of a second pack PCK2 and an ink ejection timing of a third pack PCK3 is slower than the ink ejection timing of the second pack PCK2 has been illustrated.

The data processing unit 620 of the control device 600 may compare first printing pattern information PPD1 that is previously stored with second printing pattern information PPD2 that is newly input through the comparator 621. The first printing pattern information PPD1 may be information on the target pattern APN, and the second printing pattern information PPD2 may be pattern information of a pattern ejected by the first printing pattern information PPD1. The comparator 621 may compare the first printing pattern information PPD1 with the second printing pattern information PPD2 and decide whether or not a difference between the first printing pattern information PPD1 and the second printing pattern information PPD2 is a reference value or less.

When the difference between the first printing pattern information PPD1 and the second printing pattern information PPD2 is the reference value or less, the data processing unit 620 of the control device 600 may generate a first head control signal HCS1 based on the first printing pattern information PPD1 through the control signal generator 622. When the difference between the first printing pattern information PPD1 and the second printing pattern information PPD2 exceeds the reference value, the data processing unit 620 of the control device 600 may generate a second head control signal HCS2 different from the first head control signal HCS1 based on the second printing pattern information PPD2.

In an embodiment, a case where the difference between the first printing pattern information PPD1 and the second printing pattern information PPD2 is the reference value or less may be defined as a limit correct impact, and a case where the difference between the first printing pattern information PPD1 and the second printing pattern information PPD2 exceeds the reference value may be defined as a limit false impact. In a case of the limit correct impact, the first head control signal HCS1 may be generated, and in a case of the limit false impact, the second head control signal HCS2 may be generated.

In this case, the reference value may be calculated based on a difference value between a targeting impact center and an actual center of the ejected ink. In an embodiment, the reference value may be set in the range of about 0.5% to about 15%. The reference value may be stored in the data processing unit 620 of the control device 600.

In an embodiment, a case where the targeting impact center and the actual center of the ejected ink completely coincide with each other may be decided as the limit correct impact, for example. In addition, even when the targeting impact center and the actual center of the ejected ink are different from each other, a case where a difference between the targeting impact center and the actual center of the ejected ink is within a reference value may be decided as the limit correct impact, and a case where the difference between the targeting impact center and the actual center of the ejected ink exceeds the reference value may be decided as the limit false impact.

In some embodiments, when some of a plurality of patterns exceed the reference value, a case where a ratio of the number of patterns exceeding the reference value to the total number of patterns is a reference ratio is less may be decided as the limit correct impact, and a case where the ratio of the number of patterns exceeding the reference value to the total number of patterns exceeds the reference ratio may be decided as the limit false impact. In an embodiment, the reference ratio may be set in the range of about 0.5% to about 10%.

In another embodiment, a case where the number of patterns falsely impacted and continuously disposed adjacent to each other among the plurality of patterns exceeds a reference number may also be decided as the limit false impact. In an embodiment, the reference number may be set in the range of 3 to 20.

The first head control signal HCS1 which may correspond to the pixel PX_A may include a plurality of first ejection sections ES1 and a plurality of first non-ejection sections NES1 that are alternately repeated, and the second head control signal HCS2 may include a plurality of second ejection sections ES2 and a plurality of second non-ejection sections NES2 that are alternately repeated. The number of first ejection sections ES1 of the first head control signal HCS1 may be the same as the number of second ejection sections ES2 of the second head control signal HCS2. The first ejection section ES1 and the second ejection section ES2 may have the same time duration. A first unit interval UT1, which is an interval between adjacent first ejection sections ES1 of the first head control signal HCS1, may be different from a second unit interval UT2, which is an interval between adjacent second ejection sections ES2 of the second head control signal HCS2.

In an embodiment, the second unit interval UT2 may be greater than the first unit interval UT1 by x times the first unit interval UT1 (here, x is a real number between 0 and 1), for example. It has been illustrated in FIG. 15 that the second unit interval UT2 is larger than the first unit interval UT1 by 0.3 times the first unit interval UT1, but the disclosure is not limited thereto.

Accordingly, when each of the number of first ejection section ES1 and the number of second ejection section ES2 is n, an i-th first ejection section ES1 and an i-th second ejection section ES2 may partially overlap each other (here, n is an integer of 2 or more and i is an integer of 1 or more and n or less). In addition, a j-th first ejection section ES1 and a j-th second ejection section ES2 may completely overlap each other (here, j is an integer of 2 or more and n or less, different from i). In this case, a j+1-th first ejection section ES1 and a j+1-th second ejection section ES2 may partially overlap each other.

The control device 600 may correct the ink ejection timing of the ink-jet head through third printing pattern information PPD3, which is pattern information of a pattern ejected by the second head control signal HCS2. The pattern ejected by the second head control signal HCS2 may be the transformed pattern TPN. In an embodiment, the pattern ejected by the second head control signal may be formed by stretching a pattern ejected by the first printing pattern information in the second direction D2.

The correct impact areas/false impact areas CIA and FIA may be formed on the target substrate SUB according to the pattern ejected by the second head control signal HCS2. In an embodiment, the correct impact areas/false impact areas CIA and FIA may be formed in first pixels PX_1 corresponding to the first pack PCK1, second pixels PX_2 corresponding to the second pack PCK2, and third pixels PX_3 corresponding to the third pack PCK3, respectively, for example.

Centers of ejection sections passing through centers of the correct impact areas CIA of respective packs PCK may be defined as pack reference timings NT_P. An average center of respective pack reference timings NT_P may be defined as a cell reference timing NT_C.

A case where the second pack reference timing NT_P2 coincides with the cell reference timing NT_C has been illustrated in FIG. 15.

When a first pack reference timing NT_P1 and the second pack reference timing NT_P2 are compared with each other, a second head control signal HCS2_P1 applied to the first pack PCK1 may lead a second head control signal HCS2_P2 applied to the second pack PCK2 by a first error timing MST1. When a third pack reference timing NT_P3 and the second pack reference timing NT_P2 are compared with each other, a second head control signal HCS2_P3 applied to the third pack PCK3 may lag behind the second head control signal HCS2_P2 applied to the second pack PCK2 by a third error timing MST3. A case where the first error timing MST1 and the third error timing MST3 differ from the cell reference timing NT_C by the first unit interval UT1 has been illustrated in FIG. 15, but the disclosure is not limited thereto.

The head control signals HCS may be transferred from the data output unit 630 of the control device 600 to the respective packs PCK through the head control lines HCL included in the ink-jet head unit 330.

First printing droplets HPI1, which are printing droplets of the ink-jet heads 335 of the first pack PCK1, may be ejected to places spaced apart from second printing droplets HPI2, which are printing droplets of the ink-jet heads 335 of the second pack PCK2, to the other side in the second direction D2 by a first error distance MSD1. Third printing droplets HPI3, which are printing droplets of the ink-jet heads 335 of the third pack PCK3, may be ejected to places spaced apart from the second printing droplets HPI2 to one side in the second direction D2 by a third error distance MSD3.

Accordingly, the correct impact area CIA formed by the first pack PCK1 may be formed at a place spaced apart from a cell reference line NL_C to the other side in the second direction D2 by the first error distance MSD1. The correct impact area CIA formed by the third pack PCK3 may be formed at a place spaced apart from the cell reference line NL_C to one side in the second direction D2 by the third error distance MSD3.

Here, the cell reference line NL_C refers to a line corresponding to an average position of pack reference lines NL_P, which are center lines of the correct impact areas formed to correspond to the respective packs PCK. A case where a second pack reference line NL_P2, which is a center line of the correct impact area formed by the second pack PCK2, and the cell reference line NL_C coincide with each other has been illustrated in FIG. 16.

A first pack reference line NL_P1 may be formed at a place spaced apart from the second pack reference line NL_P2 to the other side in the second direction D2 by the first error distance MSD1, and a third pack reference line NL_P3 may be formed at a place spaced apart from the second pack reference line NL_P2 to one side in the second direction D2 by the third error distance MSD3.

The pattern sensing unit 370 may individually inspect the target substrate SUB on which the predetermined pattern is printed by the respective packs PCK through the pattern sensor parts 375 corresponding to the respective packs PCK of the ink-jet head unit 330 in the one-to-one manner, as described above. As a result, it is possible to obtain the impact inspection result as illustrated in FIG. 17.

It may be seen from the impact inspection result of FIG. 17 that an impact margin area IMA, which is an area in which the correct impact areas CIA formed to correspond to the respective packs PCK overlap each other in the first direction D1 is formed to be substantially narrow. This may occur because the first pack reference line NL_P1 and the third pack reference line NL_P3 are formed to be spaced apart from the cell reference line NL_C by the first error distance MSD1 and the third error distance MSD3, respectively.

The control device 600 may correct the ink ejection timings of the ink-jet heads 335 included in the respective packs PCK by such error timings MST based on the cell reference timing NT_C to offset the error timings MST, and may correct the respective pack reference timings NT_P so as to coincide with the cell reference timing NT_C. As a result, the respective pack reference lines NL_P may be corrected to coincide with the cell reference line NL_C.

FIG. 18 illustrates an impact inspection result of the target substrate SUB after correctly correcting the ink ejection timings of the ink-jet heads 335.

It may be seen from the impact inspection result of FIG. 18 that an impact margin area IMA is formed to be relatively wider than the impact margin area IMA of FIG. 17.

As described above, by correcting the ink ejection timings of the ink-jet heads 335 included in the respective packs PCK through the control device 600, the respective pack reference lines NL_P coincide with the cell reference line NL_C, such that the impact margin area IMA may be increased.

A case where the respective pack reference timings NT_P and pack reference lines NL_P are corrected based on the cell reference timing NT_C and the cell reference line NL_C has been illustrated in the drawings, but the disclosure is not limited thereto. That is, other pack reference lines NL_P may also be corrected based on a pack reference timing NT_P or a pack reference line NL_P of a predetermined pack PCK rather than the cell reference timing NT_C and the cell reference line NL_C.

As described above, with the ink-jet printing apparatus 1000 according to the disclosure, it is possible to quantify and visualize a degree of deviation of the ink ejection timing for each pack PCK. In addition, as a result, by increasing the impact margin area IMA, it is possible to increase the reliability of the printing process of the ink-jet printing apparatus 1000.

Hereinafter, a method of forming patterns using the ink-jet printing apparatus 1000 in an embodiment described above will be described. In the following embodiments, a description of the same configurations as those of an embodiment described above will be omitted or simplified, and configurations different from those of an embodiment described above will be mainly described.

Figure 19:
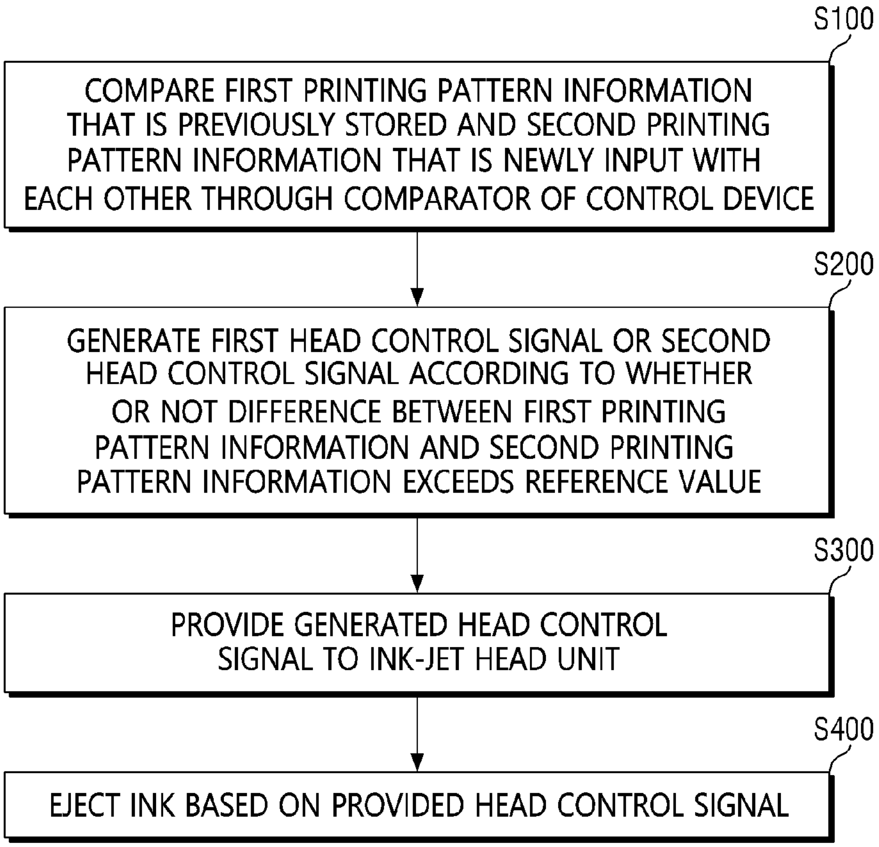
FIG. 19 is a flowchart for describing an embodiment of an inspection method of an ink-jet printing apparatus.

FIG. 19 is a flowchart for describing a method of forming patterns using the ink-jet printing apparatus.

Referring to FIG. 19, a method of forming patterns using the ink-jet printing apparatus 1000 in an embodiment may include: a printing pattern information comparing operation (S100) of comparing the first printing pattern information PPD1 that is stored and the second printing pattern information PPD2 that is input with each other; a head control signal generating operation (S200) of generating the first head control signal HCS1 based on the first printing pattern information PPD1 when the difference between the first printing pattern information PPD1 and the second printing pattern information PPD2 is the reference value or less and generating the second head control signal HCS2 different from the first head control signal HCS1 based on the second printing pattern information PPD2 when the difference between the first printing pattern information PPD1 and the second printing pattern information PPD2 exceeds the reference value; a head control signal providing operation (S300) of providing the first head control signal HCS1 or the second head control signal HCS2 to the ink-jet head unit 330; and an ink ejecting operation (S400) of ejecting the ink I based on the first head control signal HCS1 or the second head control signal HCS2.

In the printing pattern information comparing operation (S100), the reference value may be calculated based on the difference value between the targeting impact center and the actual center of the ejected ink as described above.

In the head control signal generating operation S200, a method of generating the first head control signal HCS1 or the second head control signal HCS2 is also the same as described above. In an embodiment, a case where the targeting impact center and the actual center of the ejected ink completely coincide with each other may be decided as the limit correct impact, for example. In addition, even when the targeting impact center and the actual center of the ejected ink are different from each other, a case where a difference between the targeting impact center and the actual center of the ejected ink is within a reference value may be decided as the limit correct impact, and a case where the difference between the targeting impact center and the actual center of the ejected ink exceeds the reference value may be decided as the limit false impact. In a case of the limit correct impact, the first head control signal HCS1 may be generated, and in a case of the limit false impact, the second head control signal HCS2 may be generated.

The number of first ejection sections ES1 of the first head control signal HCS1 may be the same as the number of second ejection sections ES2 of the second head control signal HCS2. The first unit interval UT1, which is the interval between the adjacent first ejection sections ES1 of the first head control signal HCS1, may be different from the second unit interval UT2, which is the interval between the adjacent second ejection sections ES2 of the second head control signal HCS2.

In the head control signal providing operation (S300), the data output unit 630 of the control device 600 may provide a predetermined head control signal HCS to the ink-jet head unit 330. In an embodiment, the data output unit 630 of the control device 600 may provide the first head control signal HCS1 or the second head control signal HCS2 to the ink-jet head unit 330.

In the ink ejecting operation S400, the ink-jet head unit 330 may eject the ink I based on the head control signal HCS received from the data output unit 630 of the control device 600. In an embodiment, the ink-jet head unit 330 may eject the ink I based on the second head control signal HCS2 to form the pattern, for example.

The control device 600 may correct the ink ejection timing of the ink-jet head 335 using the third printing pattern information PPD3, which is the pattern information of the pattern ejected by the second head control signal HCS2.

In concluding the detailed description, those skilled in the art will appreciate that many variations and modifications may be made to the preferred embodiments without substantially departing from the principles of the invention. Therefore, the disclosed preferred embodiments of the invention are used in a generic and descriptive sense only and not for purposes of limitation.

What is claimed is:

1. An ink-jet printing apparatus comprising:

an ink-jet head unit including an ink-jet head; and a control device which controls an ink ejection timing of the ink-jet head, the control device including:

a comparator comparing first printing pattern information which is stored and second printing pattern information which is input with each other;

a control signal generator generating a first head control signal based on the first printing pattern information when a difference between the first printing pattern information and the second printing pattern information is a reference value or less and generating a second head control signal different from the first head control signal based on the second printing pattern information when the difference between the first printing pattern information and the second printing pattern information exceeds the reference value; and a data output unit providing the first head control signal or the second head control signal generated by the control signal generator to the ink-jet head unit, wherein the first head control signal includes a plurality of first ejection sections and a plurality of first non-ejection sections which are alternately repeated, the second head control signal includes a plurality of second ejection sections and a plurality of second non-ejection sections which are alternately repeated, a number of the plurality of first ejection sections of the first head control signal is identical to a number of the plurality of second ejection sections of the second head control signal, a first unit interval between adjacent first ejection sections of the plurality of first ejection sections of the first head control signal is different from a second unit interval between adjacent second ejection sections of the plurality of second ejection sections of the second head control signal in a manner in which the second unit interval is stretched from the first unit interval, the first unit interval corresponds to a first pattern distance between adjacent actual pixel areas of a plurality of actual pixel areas, the second unit interval corresponds to a second pattern distance between adjacent transformed pixel areas of a plurality of transformed pixel areas, and a correct impact area and a false impact area are determined based on whether an ink ejected based on the second unit interval correctly impacts the plurality of actual pixel areas.

2. The ink-jet printing apparatus of claim 1, wherein the second unit interval is greater than the first unit interval by x times the first unit interval where x is a real number between 0 and 1.

3. The ink-jet printing apparatus of claim 1, wherein the plurality of first ejection sections and the plurality of second ejection sections have a same time duration.

4. The ink-jet printing apparatus of claim 3, wherein each of the number of the plurality of first ejection sections and the number of the plurality of second ejection sections is n, and an i-th first ejection section of the plurality of first ejection sections and an i-th second ejection section of the plurality of second ejection sections partially overlap each other where n is an integer of 2 or more and i is an integer of 1 or more and n or less.

5. The ink-jet printing apparatus of claim 4, wherein a j-th first ejection section of the plurality of first ejection sections and a j-th second ejection section of the plurality of second ejection sections completely overlap each other where j is an integer of 2 or more and n or less, different from i.

6. The ink-jet printing apparatus of claim 5, wherein a j+1-th first ejection section of the plurality of first ejection sections and a j+1-th second ejection section of the plurality of second ejection sections partially overlap each other.

7. The ink-jet printing apparatus of claim 1, wherein the first printing pattern information which is stored is information on a target pattern, and the second printing pattern information which is input is pattern information of a pattern ejected by the first printing pattern information.

8. The ink-jet printing apparatus of claim 7, further comprising a pattern sensing unit collecting the second printing pattern information.

9. The ink-jet printing apparatus of claim 8, wherein the pattern sensing unit comprises at least one pattern sensor part, the ink-jet head is provided in plural and two or more ink-jet heads gather to form at least one pack, and a number of the at least one pattern sensor part is identical to a number of the at least one pack.

10. The ink-jet printing apparatus of claim 9, wherein the at least one pattern sensor part is disposed on a same line extending in one direction as the at least one pack.

11. The ink-jet printing apparatus of claim 1, wherein the control device corrects the ink ejection timing of the ink-jet head using third printing pattern information which is pattern information of a pattern ejected by the second head control signal.

12. The ink-jet printing apparatus of claim 11, wherein the pattern ejected by the second head control signal is formed by stretching a pattern ejected by the first printing pattern information in one direction.

13. An ink-jet printing apparatus comprising:

an ink-jet head unit including an ink-jet head;

a pattern sensing unit sensing information on an ink pattern ejected to a target substrate; and a control device which controls an operation of the ink-jet head, wherein the control device receive a first ink ejection timing according to target pattern information and correct the first ink ejection timing based on the information on the ink pattern provided from the pattern sensing unit to generate a second ink ejection timing, a first unit interval between adjacent first ejection sections of a plurality of first ejection sections of a first head control signal is different from a second unit interval between adjacent second ejection sections of a plurality of second ejection sections of a second head control signal in a manner in which the second unit interval is stretched from the first unit interval, the first unit interval corresponds to a first pattern distance between adjacent actual pixel areas of a plurality of actual pixel areas, and a correct impact area and a false impact area are determined based on whether an ink ejected based on the second unit interval correctly impacts the plurality of actual pixel areas.

14. The ink-jet printing apparatus of claim 13, wherein the interval of the second ink ejection timing is greater than the first ink ejection timing.

15. The ink-jet printing apparatus of claim 13, wherein the pattern sensing unit comprises at least one pattern sensor part, the ink-jet head is provided in plural and two or more ink-jet heads gather to form at least one pack, and a number of pattern sensor parts is identical to a number of the at least one pack.

16. The ink-jet printing apparatus of claim 15, wherein the pattern sensor part is disposed on a same line extending in one direction as the at least one pack.

17. A method of forming patterns comprising:

comparing first printing pattern information which is stored and second printing pattern information which is input with each other;

generating a first head control signal based on the first printing pattern information when a difference between the first printing pattern information and the second printing pattern information is a reference value or less and generating a second head control signal different from the first head control signal based on the second printing pattern information when the difference between the first printing pattern information and the second printing pattern information exceeds the reference value;

providing the first head control signal or the second head control signal to an ink-jet head unit; and ejecting an ink based on the first head control signal or the second head control signal, wherein the first head control signal includes a plurality of first ejection sections and a plurality of first non-ejection sections which are alternately repeated, the second head control signal includes a plurality of second ejection sections and a plurality of second non-ejection sections which are alternately repeated, a number of the plurality of first ejection sections of the first head control signal is identical to a number of the plurality of second ejection sections of the second head control signal, a first unit interval between adjacent first ejection sections of the first head control signal is different from a second unit interval between adjacent second ejection sections of the plurality of second ejection sections of the second head control signal in a manner in which the second unit interval is stretched from the first unit interval, the first unit interval corresponds to a first pattern distance between adjacent actual pixel areas of a plurality of actual pixel areas, the second unit interval corresponds to a second pattern distance between adjacent transformed pixel areas of a plurality of transformed pixel areas, and a correct impact area and a false impact area are determined based on whether an ink ejected based on the second unit interval correctly impacts the plurality of actual pixel areas.

18. The method of forming the patterns of claim 17, wherein each of the number of the plurality of first ejection sections and the number of the plurality of second ejection sections is n, and an i-th first ejection section of the plurality of first ejection sections and an i-th second ejection section of the plurality of second ejection sections partially overlap each other where n is an integer of 2 or more and i is an integer of 1 or more and n or less.

19. The method of forming the patterns of claim 18, wherein a j-th first ejection section of the plurality of first ejection sections and a j-th second ejection section of the plurality of second ejection sections completely overlap each other where j is an integer of 2 or more and n or less, different from i.

20. The method of forming the patterns of claim 19, wherein a j+1-th first ejection section of the plurality of first ejection sections and a j+1-th second ejection section of the plurality of second ejection sections partially overlap each other.

* * * * *